United States Patent
Kokuryo et al.

(10) Patent No.: US 7,466,097 B2
(45) Date of Patent: Dec. 16, 2008

(54) WIPER CONTROL METHOD AND WIPER CONTROL DEVICE

(75) Inventors: Kazuto Kokuryo, Ohtsu (JP); Yoshiteru Makino, Ohtsu (JP); Satoshi Furusawa, Minato-ku (JP)

(73) Assignee: Niles Co., Ltd., Tokyo (JP)

( * ) Notice: Subject to any disclaimer, the term of this patent is extended or adjusted under 35 U.S.C. 154(b) by 0 days.

(21) Appl. No.: 10/556,760

(22) PCT Filed: May 13, 2004

(86) PCT No.: PCT/JP2004/006783

§ 371 (c)(1),
(2), (4) Date: Jul. 13, 2006

(87) PCT Pub. No.: WO2004/101333

PCT Pub. Date: Nov. 25, 2004

(65) Prior Publication Data

US 2007/0132417 A1  Jun. 14, 2007

(30) Foreign Application Priority Data

May 15, 2003 (JP) ............................. 2003-136874
May 15, 2003 (JP) ............................. 2003-136893

(51) Int. Cl.
*B60S 1/08* (2006.01)
(52) U.S. Cl. ................. 318/444; 318/452; 318/480; 318/483
(58) Field of Classification Search ......... 318/443–444, 318/452, 480, 483–484; 15/250.13
See application file for complete search history.

(56) References Cited

U.S. PATENT DOCUMENTS

| 4,859,867 A | * | 8/1989 | Larson et al. | ............... 307/10.1 |
| 4,916,374 A | * | 4/1990 | Schierbeek et al. | ......... 318/483 |
| 5,017,847 A | | 5/1991 | Leistenschneider | |

(Continued)

FOREIGN PATENT DOCUMENTS

JP          09-095217 A        4/1997

(Continued)

OTHER PUBLICATIONS

Full text of machine English translation of JP 2002-293220 reference. Publication date Oct. 9, 2002.*

(Continued)

*Primary Examiner*—Bentsu Ro
(74) *Attorney, Agent, or Firm*—RatnerPrestia

(57) ABSTRACT

A wiper control method and a wiper control device are provided which can smoothly respond to rapid change of a rainfall situation at passage of a rainfall shutoff environment such as a tunnel. A wiping state control part 42 determines entry of a vehicle into the rainfall shutoff environment, sets a wiping level low for the low level of rainfall less than a predetermined rainfall level in response to this determination or sets the wiping level high for the high level rainfall at the predetermined rainfall level or more. A rainfall level generation part 32 detects adhesion of raindrops and determines the rainfall level. A wiper driving signal generation part 48 determines wiper operation based on the rainfall level determined by the rainfall level generation part 32 and the wiping level set by the wiping state control part 42.

12 Claims, 28 Drawing Sheets

U.S. PATENT DOCUMENTS

| | | | | |
|---|---|---|---|---|
| 5,059,877 | A | * | 10/1991 | Teder .......................... 318/444 |
| 5,105,129 | A | * | 4/1992 | Shimizu et al. ............. 318/266 |
| 5,216,341 | A | | 6/1993 | Nomura et al. |
| 5,276,389 | A | * | 1/1994 | Levers ......................... 318/444 |
| 5,666,037 | A | * | 9/1997 | Reime ......................... 318/483 |
| 7,009,356 | B2 | * | 3/2006 | Tanida ......................... 318/483 |
| 7,098,618 | B2 | * | 8/2006 | Morishita .................... 318/444 |
| 2002/0093741 | A1 | * | 7/2002 | Bechtel et al. ............... 359/604 |
| 2004/0051492 | A1 | * | 3/2004 | Schmitt et al. .............. 318/443 |

FOREIGN PATENT DOCUMENTS

| | | |
|---|---|---|
| JP | 2002-046580 A | 2/2002 |
| JP | 2002-293220 | 10/2002 |
| JP | 2002-293220 A | 10/2002 |
| JP | 2003-002171 | 1/2003 |
| JP | 2003-002171 A | 1/2003 |

OTHER PUBLICATIONS

Full text of machine English translation of JP 2003-002171 reference. Publication date Jan. 8, 2003.*

Microfilm of the specification and dwgs. annexed to the request of Japanese Utility Model App. No. 076976/1985 (laid-open No. 191961/1986), Fujitsu Ten Ltd., Nov. 29, 1986, Full Text.

CD-ROM of the specification and dwgs. annexed to the request of the Japanese Utility Model App. No. 038581/1993 (laid open No. 008118/1995), Jidosha Denki Kogyo Co., Ltd., Feb. 3, 1995, par. Nos. [0006] to [0008], Figs. 2 to 5.

* cited by examiner

| RAINFALL STATE | MODE / STEP | SHORT | MEDIUM | LONG |
|---|---|---|---|---|
| HEAVY RAIN | 1 | Hi | Hi | Hi |
|  | 2 | Lo | Lo | Lo |
|  | 3 | 1 | 1.5 | 3 |
|  | 4 | 2 | 3 | 6 |
|  | 5 | 4 | 6 | 12 |
|  | 6 | 8 | 12 | 24 |
| DRIZZLING RAIN | 7 | 16 | 24 | 48 |

INTERMITTENCE TIME WOT (SECONDS)

| RAINFALL STATE | WIPING STATE |
|---|---|
|  HEAVY RAIN ↕ DRIZZLING RAIN | HIGH-SPEED CONTINUATION |
| | LOW-SPEED CONTINUATION |
| | 0.3 SECOND INTERMITTENT |
| | 0.5 SECOND INTERMITTENT |
| | 0.75 SECOND INTERMITTENT |
| | 1 SECOND INTERMITTENT |
| | 1.5 SECOND INTERMITTENT |
| | 2 SECOND INTERMITTENT |
| | 2.5 SECOND INTERMITTENT |
| ⋮ | ⋮ |
| | STOP |

FIG. 29
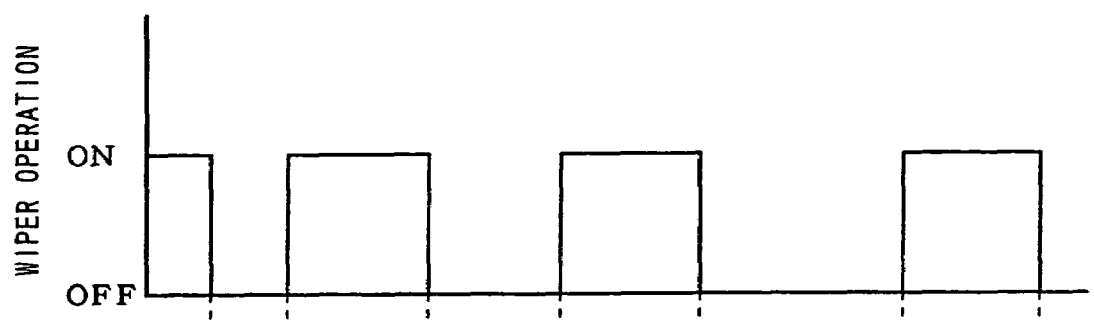
(A)
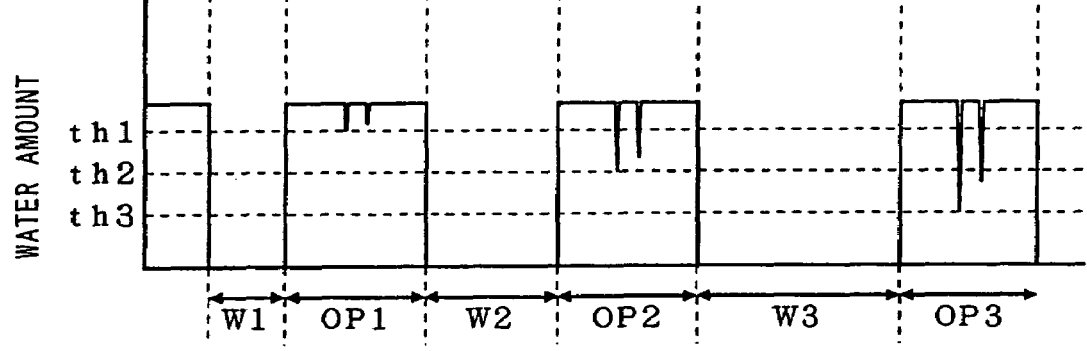
(B)

WIPER CONTROL METHOD AND WIPER CONTROL DEVICE

FIELD OF THE INVENTION

The present invention relates to a wiper control method and a wiper control device which can smoothly respond to change of rainfall situation and more particularly to a wiper control method and a wiper control device which can smoothly respond to rapid change of rainfall situation when passing through a rainfall shutoff environment such as in a tunnel.

Also, the present invention relates to a wiper control method and a wiper control device which can appropriately follow change of the rainfall situation and more particularly to a wiper control method and a wiper control device which can appropriately follow the change of rainfall situation if an adhesion amount of rainfall onto a windshield is rapidly changed such as entrance to/exit from a tunnel.

BACKGROUND ART

A conventional device for controlling a wiper by injecting an LED light or the like onto a detection surface provided on a windshield and by receiving a reflected light by a light receiving element and by performing control based on an output signal of the light receiving element. In this device, as the JP-A-4-349053, as a means for reflecting the sense of each of a driver to determination of intermittence time, a sensitivity adjustment volume is provided. The adjustment by this sensitivity adjustment volume has, as shown in FIG. 1, three types of intermittence time which can be chosen for one rainfall state, and either of short, medium or long is chosen based on the position of the sensitivity adjustment volume set manually by the driver.

In the meantime, a method for detecting dynamic adhesion of raindrops (JP-A-2001-180447) and a method for evaluating fluctuation of an output signal of a light receiving element (JP-A-2002-277386) are presented by the inventors. Also, as conventional examples of a method for detecting raindrops, a method for detecting the raindrop in comparison with a reference value (so-called threshold value method) (JP-A-61-37560, for example) and a method for detecting raindrops by an integrated value of the light receiving element output (so-called integration method) (JP-A-4-349053, for example) are disclosed.

These wiper control devices are required to perform smooth wiper wiping operation following the rainfall situation. Simply speaking, it is necessary to perform wiping when it begins to rain, while wiping should be stopped when rain is ended. In the meantime, actual rainfall situations are not such simple but changed in various ways according to rainfall, air flow, driving speed, etc.

Moreover, when a vehicle is running, it may pass through an environment where rainfall is shut off as in a tunnel. When passing through such a rainfall shutoff environment, the rainfall situation changes before entrance to the tunnel, during driving in the tunnel and after exit from the tunnel. Particularly, the rainfall situation is rapidly changed at entrance to the tunnel and exit therefrom.

Also, a conventional device for controlling a wiper by injecting an LED light or the like onto a detection surface provided on a windshield and performing control based on the light amount of its reflected light. In this device, the area of the above detection surface is extremely smaller than the total area of the windshield. Therefore, in order to improve the accuracy, a method for determining intermittence of a wiper based on a water amount carried by the wiper through wiping is proposed (International Publication No. WO 91/03393).

The invention described in International Publication No. WO 91/03393 is based on the assumption that the size of a wall of water pushed out by a sweeping wiper blade can give accurate and reliable measurement of rainfall on the windscreen between a continuous sweeping stroke of the wiper blade.

However, this assumption of the size of water wall=rainfall is not applicable to all the driving scenes. The wiper blade after wiping the raindrops is wet itself, and the water wall is formed also by the water adhering to this blade. This wall is not made from water collected by wiping but detected by the device without distinction. Also, the water supplied onto the windshield is not limited to rainfall. In a vehicle, for example, such phenomena are observed that water is dripping from an upper part of the wiping area of the wiper (roof and the like) and that water wiped out to the outside of the area is dripping after some time (hereinafter such dripping water is called as "dripping water").

To explain it in more concrete, assume a case where a vehicle enters a tunnel in the rainfall situation that raindrops with a somewhat large diameter is continuously raining and the wiper is operating continuously. At this entrance, the wiper blade itself is considerably wet. Also, a considerable amount of water is supplied to the windshield by the above dripping water. As a result, even in the situation without water supply by rainfall, the water wall pushed away by the blade is continuously formed. Therefore, in the invention described in the International Publication No. WO 91/03393, wiping by the wiper is continued despite the stop of actual rainfall.

In general, continuous operation of a wiper not in the rainfall situation to some extent is felt as extremely bothersome. In the invention described in International Publication No. WO 91/03393, control of intermittence is affected by the rainfall state immediately before even if the rainfall has stopped, and the situation that the continuous operation lasts and is felt bothersome may happen easily, which is a problem.

In the mean time, as another prior art, a method for detecting dynamic adhesion of raindrops (JP-A-2001-180447) and a method for evaluating fluctuation of an output signal of a light receiving element (JP-A-2002-277386) are presented by the inventors. Also, a method for detecting raindrops by comparison with a reference value (so-called threshold value method) (JP-A-61-37560, for example) and a method for detecting raindrops from an integrated value of light receiving element output (so-called integration method) (JP-A-4-349053, for example) are disclosed.

DISCLOSURE OF THE INVENTION

The present invention provides a wiper control method and a wiper control device which can smoothly respond to change of rainfall situation and more particularly a wiper control method and a wiper control device which can smoothly respond to rapid change of rainfall situation when passing through a rainfall shutoff environment such as in a tunnel.

Also, the present invention is based on a new finding that the above assumption of the size of water wall=rainfall is not necessarily correct all the time. And the present invention provides a wiper control method and a wiper control device which can appropriately follow change of the rainfall situation and more particularly to a wiper control method and a wiper control device which can appropriately follow the change of rainfall situation if an adhesion amount of rainfall onto a windshield is rapidly changed such as entrance to/exit from a tunnel.

Verification by the inventors confirmed the following.

As an example, suppose a case where a vehicle is passing a tunnel at the speed of 60 km/h in the rainfall state that the raindrops with somewhat large diameter are continuously falling. Before and after the tunnel is the rainfall state with the same level and the rainfall is shut off in the tunnel.

In a certain rainfall situation before entering the tunnel, it is appropriate to detect the rainfall adhering onto the windshield with predetermined detection sensitivity and to perform wiping with a predetermined wiping frequency. Next, in the tunnel, there is no more detection of raindrops by rainfall and wiping by the wiper is not needed in principle. However, fine water splashed by a vehicle running ahead adheres onto the windshield and deteriorates visibility, and such adhesion of water drops should be detected to perform wiping by the wiper.

The diameter and supply amount of water drops by splashing are not large, and it takes a certain time for the visibility to be deteriorated by splashing. In the meantime, the detection area of the rain sensor is extremely smaller than the whole surface of the windshield in general, and the state of the entire windshield is estimated based on the raindrops adhering onto the small detection surface. Therefore, if adhesion of water drops by splashing is wiped with a high wiping frequency, unnecessary wiping frequents before deterioration of the visibility on the windshield, which is bothersome. Therefore, in the tunnel, it is necessary to keep the wiping frequency low to some extent while responding to adhesion of splashing.

Next, after exit from the tunnel, the rainfall situation is almost the same as before entrance, and the same level of detection sensitivity and the same level of wiping frequency as before entrance to the tunnel are considered to be necessary. However, for the sense of a general driver, a desire to ensure safety becomes dominant at rapid change of environment, especially when the environment is rapidly deteriorated. Particularly, in the state where a rainfall shutoff state lasts for a certain time such as in the tunnel, the driver's sense gets used to a favorable visibility without rainfall, and change of the environment at exit from the tunnel tends to be felt as more rapid.

Therefore, at the exit from the tunnel jumping into the rain from the favorable visibility state, the driver wants to wipe the rapid deterioration of the visibility quickly in many cases. From this, even if the rainfall is the same before and after the tunnel, higher detection sensitivity and wiping with higher frequency are desired at the exit from the tunnel. Even at the exit from the tunnel, if the rainfall is small, it takes time for the visibility to deteriorate, and such higher detection sensitivity and wiping frequency are not required.

Based on this consideration, the inventors obtained the finding that in the tunnel, it is necessary to keep the wiping frequency against splashed water low while preparing for the exit from the tunnel. That is, the wiping frequency is preferably kept low while responding to fine water drops such as splash, the wiping intermittence time is made longer and raindrops with larger diameter should be responded quickly while the wiping frequency is increased.

Next, as another example, suppose a case of passing through a tunnel at a high speed such as 100 km/h in the same rainfall situation as above.

In running at a high speed, wind pressure gets larger and a phenomenon is observed that the raindrops adhering on the windshield spread in a moment and form a water film. With the rain sensor for detecting raindrops by receiving a reflected light from the windshield, once the water film is generated on the detection surface, the subsequent adhering water drops are absorbed by the water film, which causes the change of the light receiving amount by adhesion of raindrops, that is, change of the output of the light receiving element to become extremely small.

Therefore, even in the heavy rainfall situation, it becomes difficult to detect adhesion of raindrops. In the meantime, in the case of heavy rain, the visibility is suddenly deteriorated, and it is necessary to detect adhesion of raindrops in a short time and to perform wiping by the wiper.

This is also applicable to the exit of a tunnel. That is, when a vehicle jumps out of the tunnel without rainfall into the heavy rain at a high speed, the visibility is suddenly deteriorated. However, the raindrops adhering onto the windshield is influenced by running wind and form a water film in a moment, and change of the output of the light receiving element by adhesion of subsequent raindrops becomes very small.

Therefore, in order to detect adhesion of raindrops in running at a high speed, especially when exiting from a tunnel at a high speed, it is desirable to increase the detection sensitivity so that a very small change of the output of the light receiving element can be captured.

On the other hand, with such high detection sensitivity, nonconformity might occur in the other driving scenes. For example, when keeping on running at a low speed with high detection sensitivity, the sensitivity is too high and that results in frequent unnecessary wiping. Based on this consideration, the inventors have obtained the finding that it is preferable to change the detection sensitivity according to the running speed of the vehicle. Especially, it is preferable to increase the detection sensitivity in proportion to the running speed.

Next, the following consideration was obtained in relation to the output of the light receiving element in running at a high speed. FIG. 2 is a graph showing a waveform model of an output signal of a light receiving element in running at a high speed.

First, in the output signal of the light receiving element, signal change when a wiper blade passes through the detection surface is extremely large in general. Therefore, at the passage of the wiper blade (wiper driving period), the signal is masked and removed from the detection objects. That is, in the mask section shown in FIG. 2, detection of raindrops is not performed.

In FIG. 2, raindrops adhere at D1, D2 and D3. At the first adhesion D1, change occurs in the output signal of the light receiving element. In running at a high speed, a water film is formed immediately after D1, and the signal change gets extremely small at the next adhesion D2. In this way, adhesion of raindrops cannot be detected easily after the water film is formed.

On the other hand, a large change occurs in the output signal of the light receiving element at the adhesion D3 in the mask section. This is because the water film formed on the detection surface is removed by passage of the wiper blade. However, the water film is formed immediately after D3 and adhesion cannot be detected easily again after completion of the mask section. In this way, even if a large signal change occurs in the mask section, the mask section is removed from the detection objects in the conventional detecting methods, and adhesion of raindrops after D1 cannot be detected easily.

Based on this consideration, the inventors obtained the finding that in running at a high speed, the detection accuracy can be improved by detecting adhesion of raindrops with signal change in the mask section as an object to be detected. Especially, it is preferable to detect the signal change immediately after the passage of wiper blade over the detection surface.

More preferably, adhesion of the raindrops is detected based on the momentum of the output signal of the light receiving element in the mask section. In this way, it is not necessary any more to grasp and exclude the signal change caused by passage of the wiper blade, and control can be more simplified.

In the meantime, based on the examination by the inventors, such a consideration was obtained that the above problems are caused by the fact that the adhesion of rain itself on the windshield cannot be recognized, or micro adhesion cannot be separated. That is, if raindrop detection is possible, the wiper can be smoothly controlled from removal from continuous operation to stop.

In concrete, the wiper waiting time (including intermittent/continuous operation) is determined by raindrop adhesion cycle by difference and fluctuation of a signal at adhesion. In this determination, the water amount collected by the wiper is not referred to at all. The water amount collected by the wiper is used as a condition to determine a point of change in rainfall by the water amount collected by the wiper till the adhesion cycle which cannot maintain the intermittent state (including continuous wiping) is detected and to cause transition to stop to happen.

A basic idea of the present invention will be described with reference to FIG. 19. The lower stage of FIG. 19 shows control of the wiping state by the wiper (including stop, intermittent wiping and continuous wiping) based on adhesion of raindrops.

In FIG. 19, in the section in which adhesion of raindrops is detected, wiping is performed in a predetermined wiping state (1-second intermittent time, for example) according to the adhesion cycle of the raindrops. Next, if the situation where adhesion cannot be detected occurs for a certain section, it causes the situation that the intermittent state is different from the determination of intermittence. Therefore, the wiping frequency is changed in the direction approaching the stop so as to match it to the current situation. In the above example, for example, the frequency is lowered to 2-second intermittence time.

On the other hand, as for the water amount collected by the wiper blade with wiping operation of the wiper and passing through the detection surface (hereinafter referred to as "passing water amount"), a large value is continuously detected at every wiping due to influence of the dripping water or the like.

The following consideration was obtained by observing the state of windshield glass before and after the change of rainfall situation.

TABLE 1

|  | Passing water amount | Presence of raindrop adhesion | Presence of discrepancy |
| --- | --- | --- | --- |
| I | Large | No | Discrepant |
| II | Large | Yes | No |
| III | Small | No | No |
| IV | Small | Yes | No |

In this Table 1, if it rains, there is adhesion of raindrops on the windshield, and the adhering raindrops are collected by the wiper and a predetermined passing water amount is detected. Thus, the cases of II and IV do not matter. In the case of III, though the adhesion of raindrops is not detected, the passing water amount is detected. But the value of the passing water amount is at a threshold value or less and small, it is allowed as in the tolerable range. That is because, as partially described in the International Publication No. WO 91/03393, adhesion probability is limited by position or area of the detection surface.

In the meantime, in the case of I, though the passing water amount is detected as a value larger than a predetermined threshold value, adhesion of raindrops is not detected. Such a case is not possible in normal rainfall situation. That is, the fact that the passing water amount is detected as a large value above the predetermined threshold value means considerably heavy rain, and no adhesion of raindrops on the detection surface at all in such a rainfall situation is impossible. In such a case, discrepancy arises in the assumption of passing water amount=rainfall and therefore, it is rather appropriate to consider that this value of passing water amount is not caused by rainfall.

Therefore, the fact that detection of rainfall (adhesion of rainfall) becomes impossible under the situation that the amount of water collected by the wiper is detected larger than a predetermined threshold value is determined as remarkable change of the driving environment as entrance to a tunnel, and the wiping by the wiper is preferably stopped once.

In the meantime, suppose the case of exit from the tunnel. In case of a tunnel which is not much long, the rainfall situation before and after the tunnel is the same in many cases. That is, if it is heavy rain before entering the tunnel, it is also heavy rain after the exit. The driver's sense becomes more sensitive at rapid change of the situation and an instinct to secure safety works. Thus, when the visibility is rapidly deteriorated by rain as at exit from the tunnel, a desire to perform wiping quickly becomes dominant.

On the other hand, control of an auto wiper is generally executed so that the wiping frequency is increased stepwise at start of raining except an exceptional case of rainstorm. This stepwise control is necessary to match the operation of the wiper to the human senses.

By this, if wiping by the wiper is lowered to the stop state once after entrance into the tunnel, the wiping frequency should be increased stepwise from stop if it is raining at exit from the tunnel (stop->3-second intermittent->2-second intermittent->1-second intermittent, for example). Then, it takes time for the wiping frequency to adapt to the rainfall. Such control does not match the driver's desire.

Therefore, in the present invention, intermittence inside the sensor (WP waiting time) is determined by the adhesion cycle and is not brought to the stop state. That is, stop of wiping by the wiper does not mean stop of intermittence but wiping is resumed at timing when the next adhesion cycle is established, and if there is no adhesion, it is linked to the stop state in the end.

In concrete, for wiping by the wiper, control of intermittence is executed independently based on adhesion of raindrops with the intermittence before entrance into the tunnel, a wiping signal outputted according to the intermittence is masked so that wiping by the wiper is apparently stopped, and at exit from the tunnel, following to the rainfall is started from the intermittent state determined independently.

Such control smoothly realizes the operation of wiping->stop->wiping at passage through a tunnel which is not much long.

BRIEF DESCRIPTION OF THE DRAWINGS

FIG. 29 is a diagram for explaining the relation between a wiper operating signal and timing for detecting a passing water amount.

BEST MODE FOR CARRYING-OUT OF THE INVENTION

First Preferred Embodiment

Next, a first preferred embodiment of the present invention will be described. The first preferred embodiment of the present invention is to determine such a driving scene that a vehicle enters a rainfall shutoff environment such as a tunnel from a certain rainfall situation and to adjust correspondence between the predetermined rainfall level and a predetermined wiping state.

Figure 3:
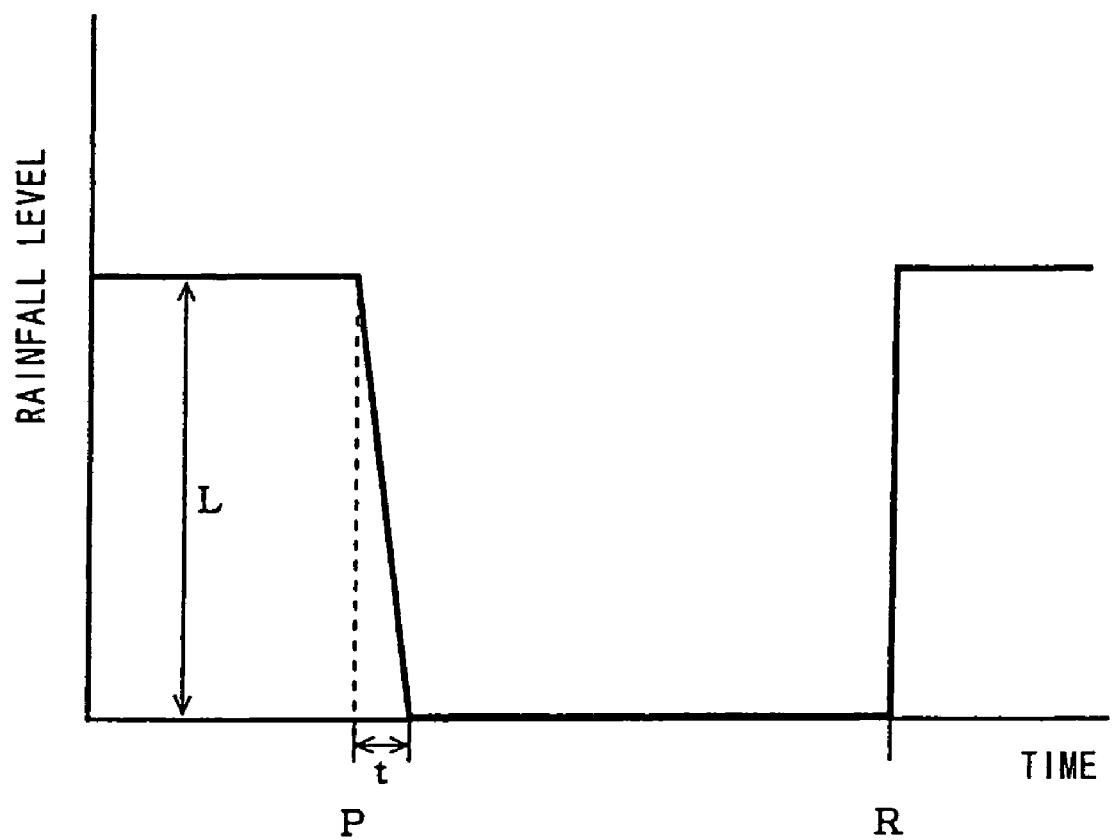
FIG. 3 is a conceptual diagram for explaining change of a rainfall level at passage of a tunnel.

First, a method for determining such a driving scene that a vehicle enters a rainfall shutoff environment such as a tunnel from a certain rainfall situation will be described using FIG. 3. FIG. 3 is a conceptual diagram for explaining change of the rainfall level at passage of a tunnel.

Upon consideration of the inventors, the following finding on the rainfall level at passage of a tunnel was obtained. In FIG. 3, a running vehicle enters a tunnel at P and exits from the tunnel at R. A certain rainfall level continues before entrance to the tunnel, and the rainfall level is decreased close to zero (no rainfall) by entrance into the tunnel. That is, at the entrance into the tunnel, the rainfall level is lowered by a predetermined amount L within a predetermined time t. Then, the state that the rainfall level is lowered is maintained for a certain period of time and the rainfall level is returned to original by exit from the tunnel.

Therefore, by capturing a phenomenon (event) that the rainfall situation is lowered by the predetermined amount L from the certain rainfall level in the predetermined time t and the lowered state is maintained for the predetermined period of time, the driving scene that the vehicle enters the rainfall shutoff environment such as a tunnel from a certain rainfall situation can be determined.

Also, in order to ensure this determination, it may be so constituted that the running state of the vehicle is confirmed using car speed information and getting dark of outside the vehicle due to entrance to the tunnel is confirmed by auto light information.

Such determination of the driving scene can be made, for example, by identifying a status (vehicle state and driving environment state) at a certain point of time and by detecting that a specific event occurs at a point of time later than the point.

For example, when the vehicle state is constant-speed running at a point of time and the driving environment state is a certain rainfall situation, by detecting an event that the rainfall level is lowered by a predetermined amount for 1 second, and the lowered state is maintained for 3 seconds, for example, the driving scene that the vehicle enters the rainfall shutoff environment such as a tunnel from a certain rainfall situation can be determined.

Figures 1, 2:
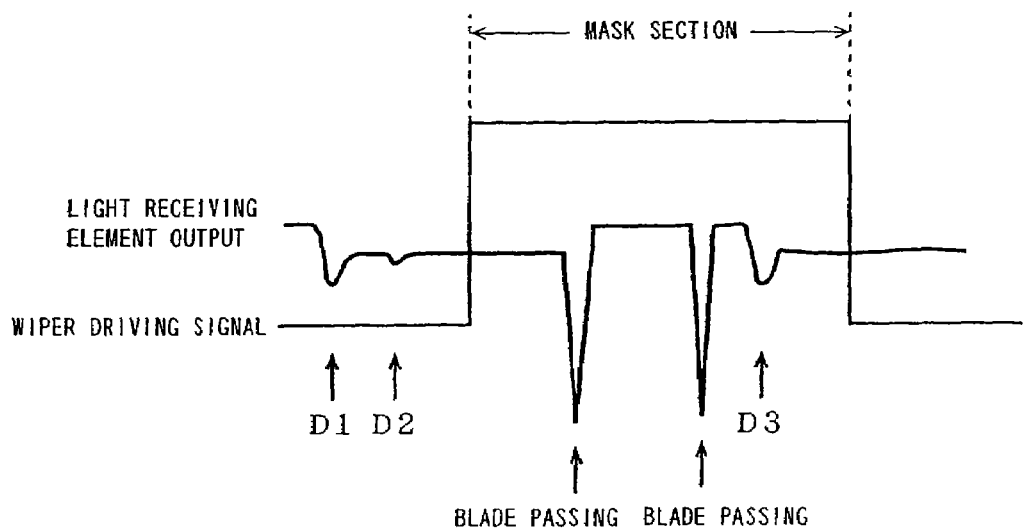
FIG. 1 is a table for explaining a conventional wiper control method.
FIG. 2 is a diagram showing a waveform model of an output signal of a light receiving element in running at a high speed.

Next, a method for adjusting correspondence between a predetermined rainfall level and a predetermined wiping state will be described. In order to facilitate understanding of a first preferred embodiment of the present invention, a control method by a conventional sensitivity adjustment volume will be explained with reference to FIG. 1. In the conventional control method by sensitivity adjustment volume, if the rainfall state is specific drizzling rain, for example, the step of intermittence time is set to 7. The relationship between this specific drizzling rain and the step 7 is fixed from this time. That is, if the rainfall state is determined as drizzling, the intermittence time of the step 7 is selected all the time. According to the sensitivity volume setting by the driver, actual intermittence time is chosen from the three modes of intermittence time included in the step 7.

In the first preferred embodiment of the present invention, the relation between the rainfall state level and the intermittence time step (wiping state) is not fixed to one-to-one but it is changed dynamically. That is, the correspondence between each of the rainfall state levels and each of the wiping states is changed according to the driving scene.

Figure 4:
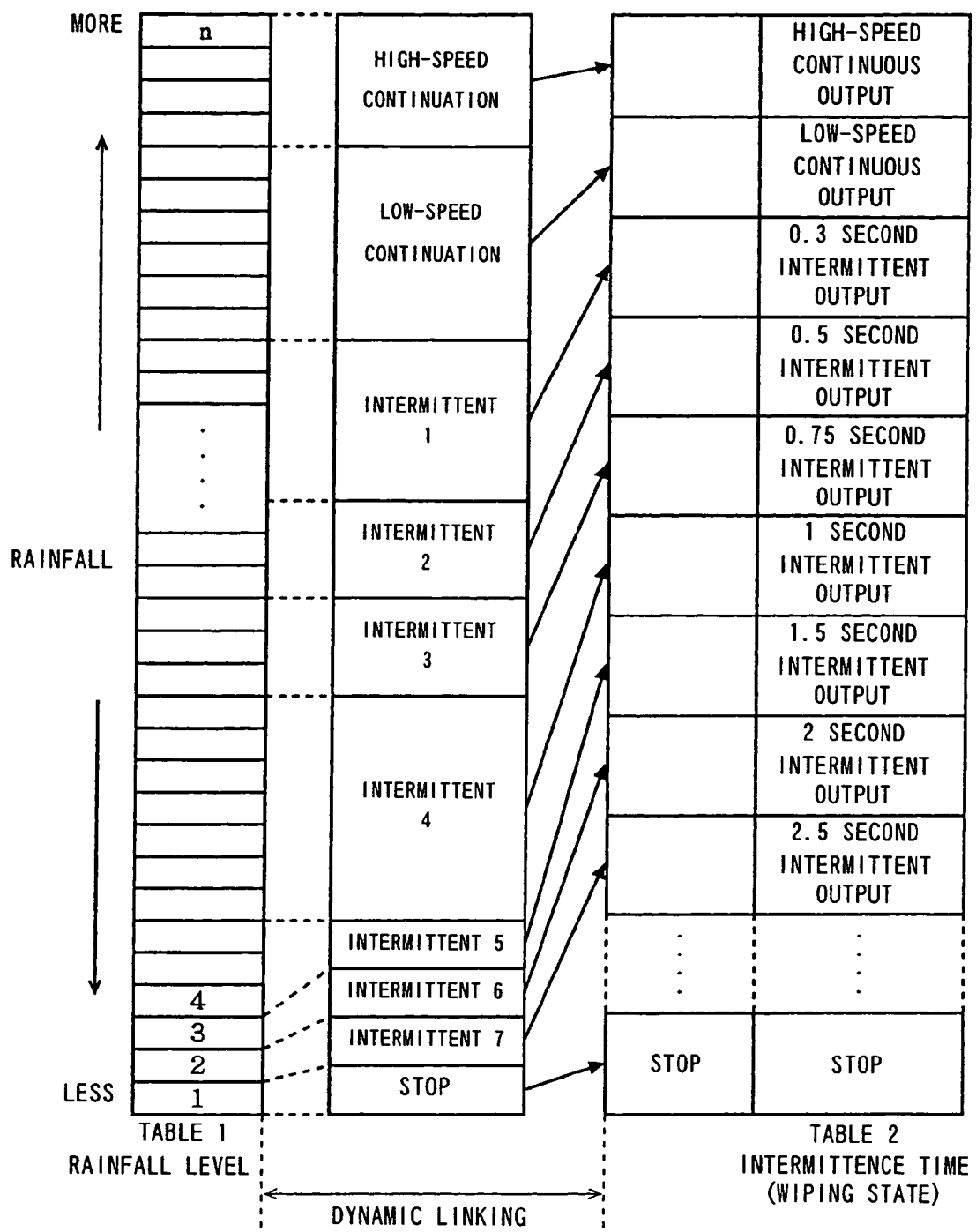
FIG. 4 is a conceptual diagram for explaining a first preferred embodiment of the present invention.

The method of the present invention will be described in concrete using FIG. 4. FIG. 4 is a conceptual diagram for explaining the first preferred embodiment of the present invention. FIG. 4. includes Table 1 and Table 2. In Table 1, rainfall levels are defined stepwise. In Table 2, the wiping state is classified and defined as a plurality of stepwise wiping levels according to the wiping waiting time and wiping speed. The wiping waiting time includes zero (which means no waiting time).

FIG. 4 shows a definition example of the wiping state. As for the wiping state, as shown in FIG. 4, for example, the longer the wiping waiting time is, the longer the intermittence time becomes, and if the wiping waiting time becomes infinite (∞), it causes the stop state. On the other hand, the shorter the wiping waiting time is, the shorter the intermittence time becomes, and when the wiping waiting time is zero, it means continuous wiping. And the continuous wiping is divided by wiping speed into high-speed continuous wiping and low-speed continuous wiping. By combining the wiping waiting time and the wiping speed in this way, various wiping operations of the wiper can be controlled.

The first preferred embodiment of the present invention dynamically associates each item of the rainfall level in Table 1 to each item of the wiping level in Table 2. For example, in a tunnel, the rainfall level requiring continuous wiping after exit from the tunnel is associated with a higher wiping level to raise the wiping level, while the rainfall level such as adhesion of micro splashed water is associated with a lower wiping level to lower the wiping level.

As an example, before entrance into a tunnel, the rainfall levels n to n-3 on the larger rainfall side are allocated to high-speed continuous wiping, the rainfall levels n-4 to n-8 to low-speed continuous wiping and the rainfall levels n-9 to n-15 to intermittence 1. After entrance into the tunnel is determined, the rainfall levels n to n-8 may be allocated to the high-speed continuous wiping and the rainfall levels n-9 to n-15 to intermittence 4 with longer wiping waiting time. By lowering the lower limit of the rainfall level allocated to the high-speed continuous wiping in this way, the wiping level can be raised for the predetermined rainfall levels.

In an adjustment method of wiping determination condition for changing the correspondence between the rainfall level items and the wiping level items in this way, to raise the wiping level means to raise the wiping level associated with a specific rainfall level to a higher one (shorter waiting time or faster wiping speed). On the other hand, to decrease or lower the wiping level means to bring the wiping level associated with a specific rainfall level to a lower one (longer waiting time or slower wiping speed).

Figure 5:
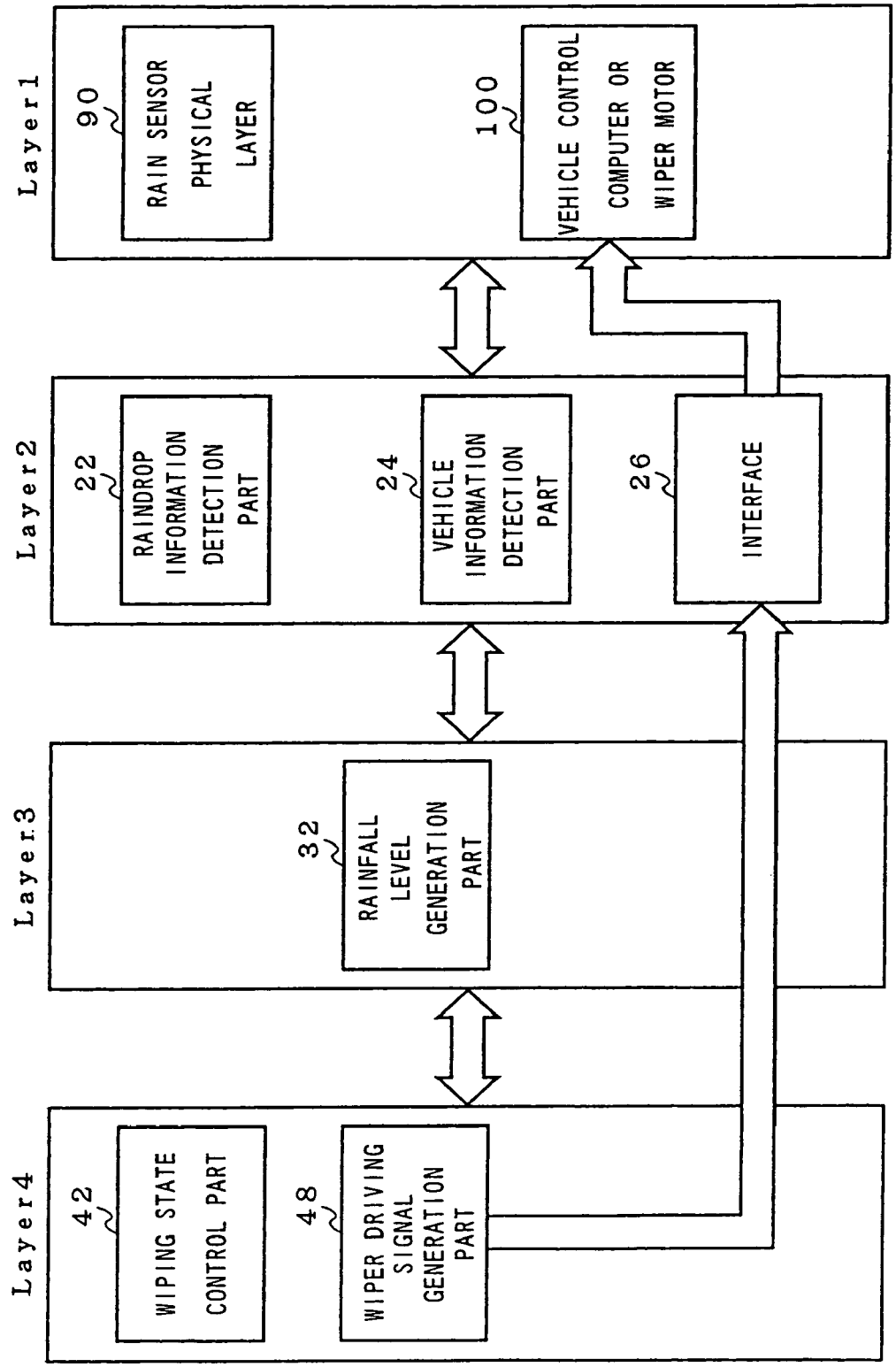
FIG. 5 is a block diagram for explaining the configuration of a wiper control device according to the first preferred embodiment of the present invention in the layered structure.

Next, the first preferred embodiment of the present invention will be described more concretely. FIG. 5 is a block diagram for explaining the construction of the wiper control device according to the first preferred embodiment of the present invention in layered structure. In FIG. 5, the wiper control device according to the first preferred embodiment of the present invention can be represented by four-layered construction, and between each of the layers, data or signals are made to communicate through a common interface such as SAP (service access point), for example.

A first layer includes a rain sensor physical layer 90 and a vehicle control computer or a wiper motor 100, a second layer includes a raindrop information detection part 22, a vehicle information detection part 24 and an interface 26, a third layer includes a rainfall level generation part 32, and a fourth layer includes a wiping state control part 42 and a wiper driving signal generation part 48. Each of them can be realized by software.

The rain sensor physical layer 90 is comprised by an optical mechanism and a circuit, an optical mechanism in the method that light from a light emitting element is reflected by a detection surface and a reflected light is received by a light receiving element and circuits such as a filter circuit for processing output of the light receiving element, an amplifier circuit, an A/D converter, etc., for example. An example of such a rain sensor is disclosed in the JP-A-2001-180447 and the JP-A-2002-277386.

The optical mechanism will be described. Light emitted from a light emitting element such as an LED, for example, is led to a glass substrate (windshield glass) which is a transparent substrate to detect water drops through a prism glass or the like. The led light is fully reflected by the detection surface and enters a light receiving element such as a photodiode, for example, through the above prism glass. Such an optical mechanism is arranged/constituted so that in the state where no water drop adheres, for example, the maximum output is generated at the light receiving element. At this time, if there is adhesion of a water drop or the like on the detection surface, the output of the light receiving element is lowered. Such a detection surface is arranged in the range of wiping operation of the wiper.

A vehicle control computer or wiper motor 100 is connected to the wiper control device of the present invention and can be selected as appropriate according to the preferred embodiment of the present invention. When the vehicle control computer is connected, the wiper motor is controlled through the vehicle control computer. When the wiper motor is connected, the wiper motor is directly controlled.

A raindrop information detection part 22 detects and outputs various types of information relating to raindrops based on an output signal of the light receiving element of the rain sensor. Information includes phenomenon as adhesion of raindrops, fluctuation of adhering rain drops, displacement amount of signal level per predetermined time, etc.

A vehicle information detection part 24 detects and outputs various type of information controlled on the vehicle side. Vehicle information includes an auto stop signal indicating operation section of the wiper, car speed information, position information of wiper switch, auto light information, set position information of sensitivity volume, position information of light switch, etc.

An interface 26 converts a wiper driving signal from the higher layer (fourth layer) to a signal in the format suitable for the vehicle control computer or wiper motor, respectively and outputs it.

A rainfall level generation part 32 determines the current rainfall level based on the output of the raindrop information detection part 22 and generates the rainfall level. In concrete, to which of the rainfall levels defined in Table 1 of FIG. 2 the level corresponds is determined. As mentioned later, it is preferable that an established reference rainfall level and a temporary rainfall level should be provided for the rainfall level.

A wiping state control part 42 determines a driving scene using the car speed information, rainfall level information, auto light information, control information such as a timer, etc. and adjust the correspondence between the rainfall level and the wiping level according to the determined driving scene. For example, the wiping state control part 42 determines the driving scene based on the rainfall level generated by the rainfall level generation part 32, car speed information detected by the vehicle information detection part 24, auto light information, etc. and determines to which wiping level a predetermined rainfall level is allocated according to the determined driving scene. Also, when the sensitivity volume has been set, the sensitivity volume is considered if necessary to adjust the correspondence between the rainfall level and the wiping level. The wiping state control part 42 is provided with a function to determine a driving scene and a function to adjust correspondence in this way.

In concrete, the wiping state control part 42 determines the driving scene that the vehicle enters the tunnel from the certain rainfall situation using control information such as car speed information, rainfall level information, auto light information, timer, etc. and allocates the rainfall level at a predetermined threshold value or more to the wiping level higher than that before entrance to the tunnel and the rainfall level less than the predetermined threshold value to the wiping level equal to or lower than that before entrance to the tunnel.

A wiper driving signal generation part 48 determines a wiping state as the items in Table 2 of FIG. 4 based on the correspondence between the rainfall level and the wiping level set by the wiping state control part 42 and the rainfall level generated by the rainfall level generation part 32 and outputs a wiper driving signal of a predetermined wiping waiting time and a predetermined wiping speed. The wiper driving signal is outputted to the vehicle control computer or wiper motor 100 through the interface 26.

(Generation of Rainfall Level)

Next, generation of the rainfall level will be described. The rainfall level can be determined based on the raindrop information detected by the raindrop information detection part 22.

A method for detecting the raindrop information used for generation of the rainfall level will be described. As a method for detecting the rainfall information, the method for detecting dynamic adhesion of raindrops disclosed by the inventors (JP-A-2001-180447) can be used. With this method, a delay signal is generated from a signal of the light receiving element, a difference between the signal of the light receiving element and the delay signal is acquired and it is determined that there was a collision of a water drop on the detection surface when the difference occurs. Or a first delay signal of the signal of the light receiving element is generated, a second delay signal is generated from the first delay signal, a difference between the first delay signal and the second delay signal is acquired and when the difference occurs, it is determined that there was a collision of a water drop on the detection surface. By this method, dynamic adhesion itself of raindrops or the like can be captured.

Therefore, the raindrop information detection part 22 detects the phenomenon of collision of the raindrops on the detection surface and outputs it as adhesion of raindrops.

The rainfall level generation part 32 may determine the level of rainfall based on such raindrop adhesion information and generate the current rainfall level. For example, it may be so constituted that rainfall levels are defined stepwise based on the number of adhesion per predetermined time, and the rainfall level generation part 32 determines the rainfall level according to the number of adhesion per predetermined time. In concrete, the larger the number of adhesion per predetermined time is, the higher the rainfall level becomes, and if the number of adhesion is small, the rainfall level may be lowered. In this way, the rainfall state can be divided into detailed levels and defined based on the raindrop adhesion information.

Also, for determining the rainfall level, fluctuation of adhering raindrops can be used. In the JP-A-2002-277386 disclosed by the inventors, a method is disclosed which can indirectly detect dynamic fluctuation of adhesion by dynamic fluctuation of a signal of a light receiving element obtained through the raindrops adhering on the detection surface and determines the size of a raindrop and how the raindrops are hitting by a change pattern of the fluctuation of the signal. In this way, the size and the like of the raindrops can be estimated by information of raindrop fluctuation, by combining this raindrop fluctuation information with adhesion of raindrops, the rainfall state can be divided into further detailed levels.

The change pattern of the fluctuation of the signal used for the above determination can be a change pattern of time of fluctuation of the above signal, and the length of fluctuation of adhesion can be detected indirectly by the length of fluctuation of the signal. For example, if the adhesion is a raindrop, the larger the raindrop is, the longer the fluctuation lasts as its characteristic, and the size of the raindrop can be estimated from the length of the detected fluctuation.

Also, the change pattern of the fluctuation of the signal used for the above determination can be a change pattern of the size of fluctuation of the above signal, and the size of fluctuation of adhesion can be indirectly detected by the size of the fluctuation of the signal. For example, if the adhesion is a raindrop, the larger the raindrop is, the larger the fluctuation is as its characteristic, and the size of the raindrop can be estimated from the detected size of the fluctuation. Parameters for representing the size of fluctuation include the number of change times of increase/decrease within the fluctuation, change amount of the increase, direction of increase/decrease of the change, etc.

Therefore, the raindrop information detection part 22 detects and outputs the change pattern of the signal fluctuation. In concrete, the length of the signal fluctuation, the number of change times of increase/decrease within the signal fluctuation, the change amount of increase, direction of increase/decrease of the change, etc. are outputted.

The rainfall level generation part 32 may determine the state of rainfall in more detail from the adhesion of raindrops and change pattern of the signal fluctuation detected by the raindrop information detection part 22 in this way.

For example, correspondence between various characteristics of change of signal fluctuation including the change pattern of the size of signal fluctuation and the change pattern of the length of the signal fluctuation and the size of raindrops is acquired experimentally, and this is stored in the memory as a table. Then, the rainfall level generation part 32 may determine the size of the raindrops from the change pattern of the detected signal fluctuation based on this table.

The rainfall level generation part 32 may determine the rainfall level from the number of adhering raindrops detected per predetermined time and the size of adhering raindrops and generate the current rainfall level.

Moreover, as a method for detecting raindrop information, a method for detecting raindrops by comparison with a reference value (so-called threshold value method) disclosed in the JP-A-61-37560 and a method for detecting raindrops from an integrated value of light receiving element output (so-called integration method) disclosed in the JP-A-4-349053 can be used. The rainfall level generation part 32 can determine the rainfall level based on the raindrop information detected by these methods.

(Temporary Rainfall Level)

Next, the rainfall level generation part 32 generates an established reference rainfall level and a temporary rainfall level. The temporary rainfall level is determined in rapid response to change of the rainfall situation. That is, if detection information from the raindrop information detection part 22 is changed, the temporary rainfall level is changed in accordance with it. In the meantime, the established reference rainfall level is determined following a relatively long determination period.

An example of a control method of the temporary rainfall level and the established rainfall level will be described. When the detection information from the raindrop information detection part 22 is changed, the rainfall level generation part 32 determines the temporary rainfall level in accordance with it. It is determined using a timer if the temporary rainfall level is maintained for a predetermined period of time. If the temporary rainfall level is maintained for a predetermined period of time, the reference rainfall level is updated by the maintained temporary rainfall level. In the meantime, if the temporary rainfall level is not maintained for a predetermined period of time but for the time being, the reference rainfall level is not changed but maintained as original.

(Wiping State Control Part)

Figure 6:
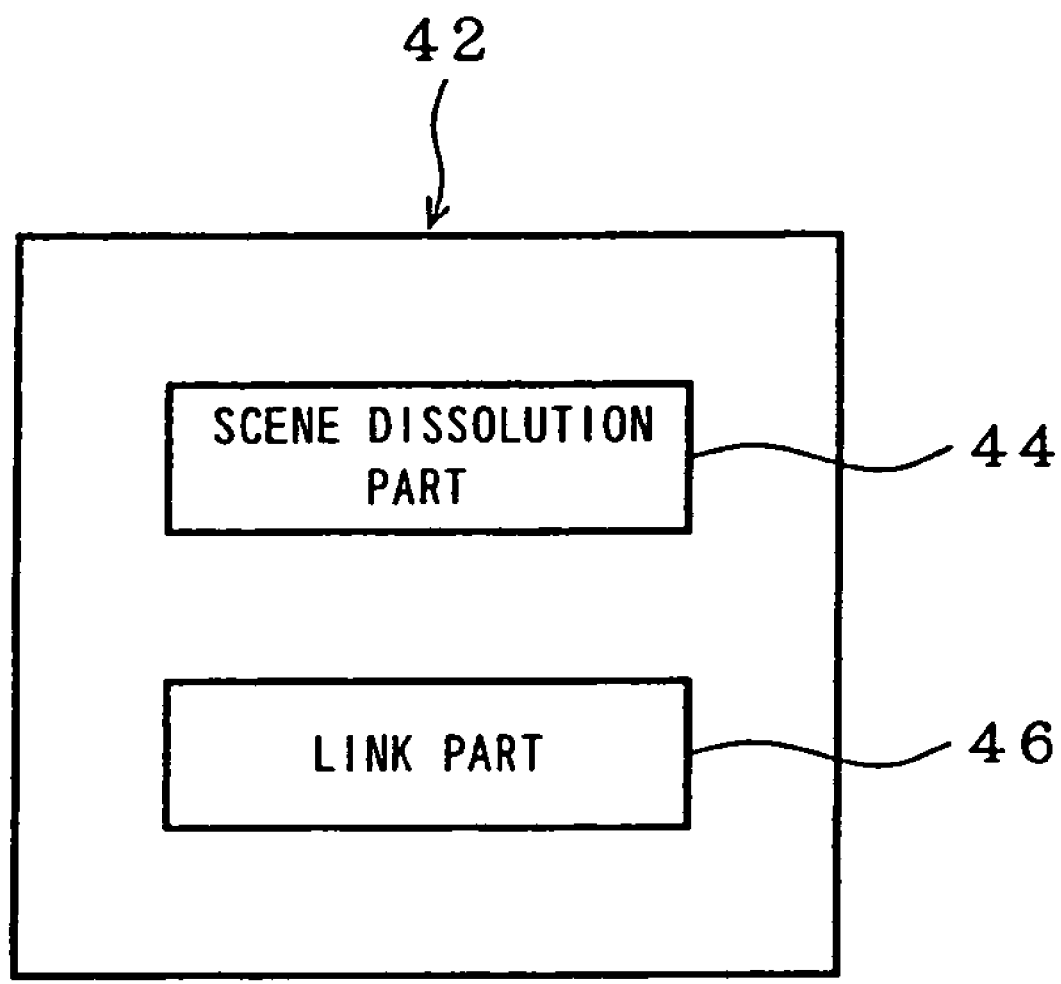
FIG. 6 is a block diagram for explaining the configuration of a wiping state control part.
Figure 7:
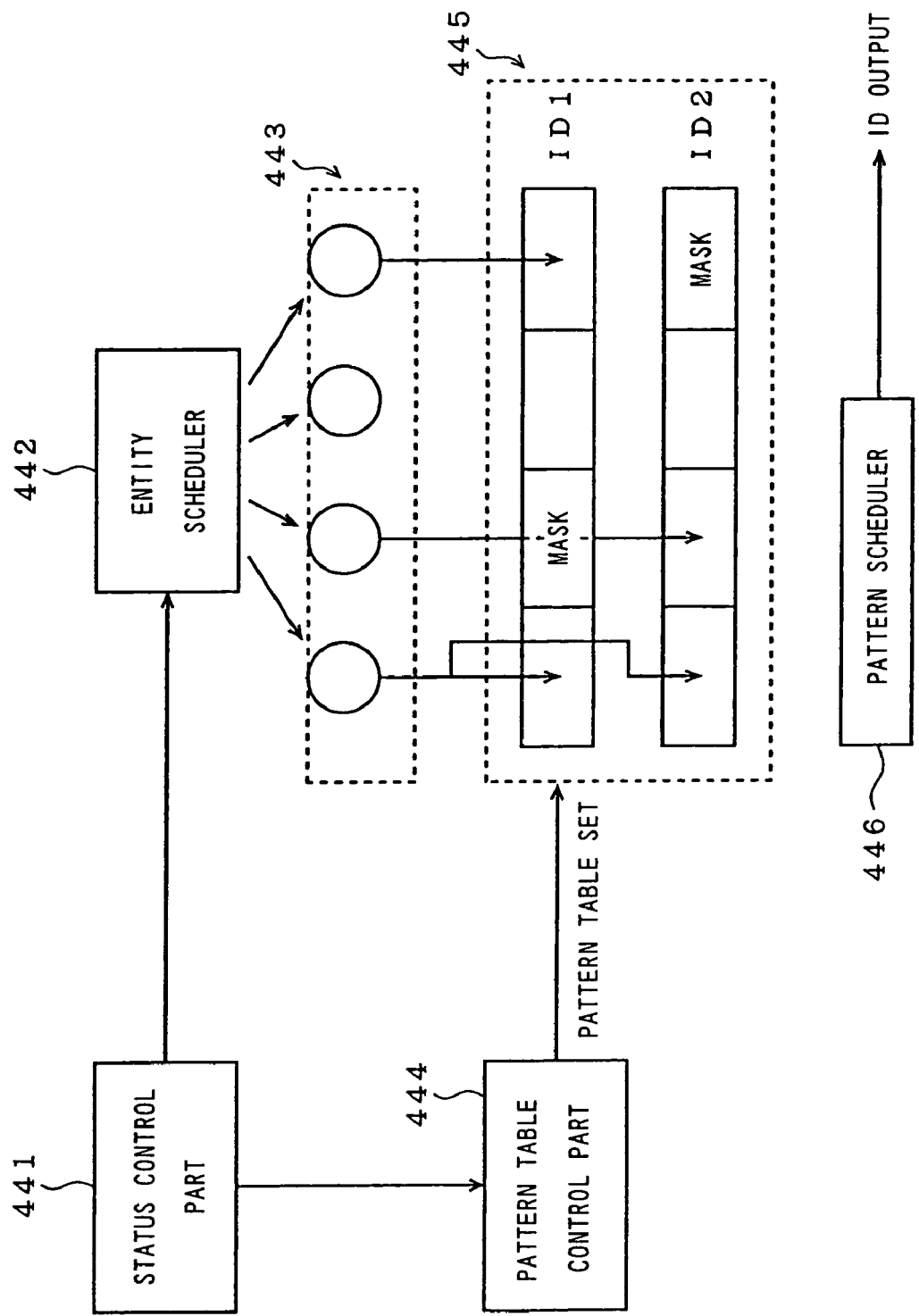
FIG. 7 is a conceptual diagram for explaining a method for determining the scene.
Figure 8:
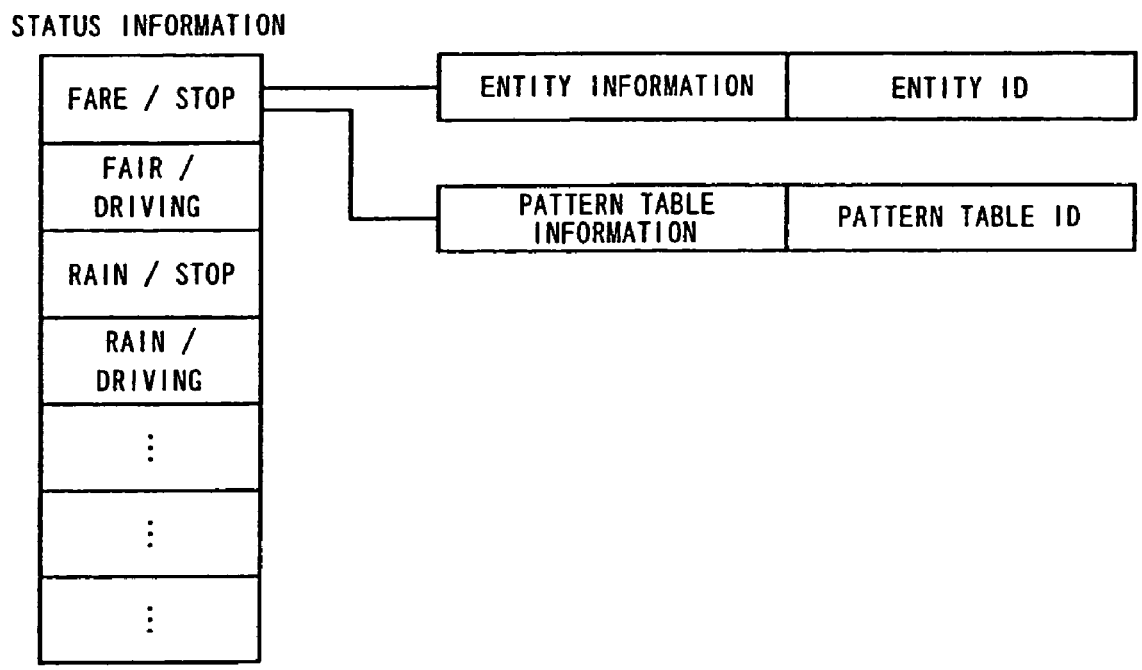
FIG. 8 is a conceptual diagram for explaining a method for determining the scene.
Figure 9:
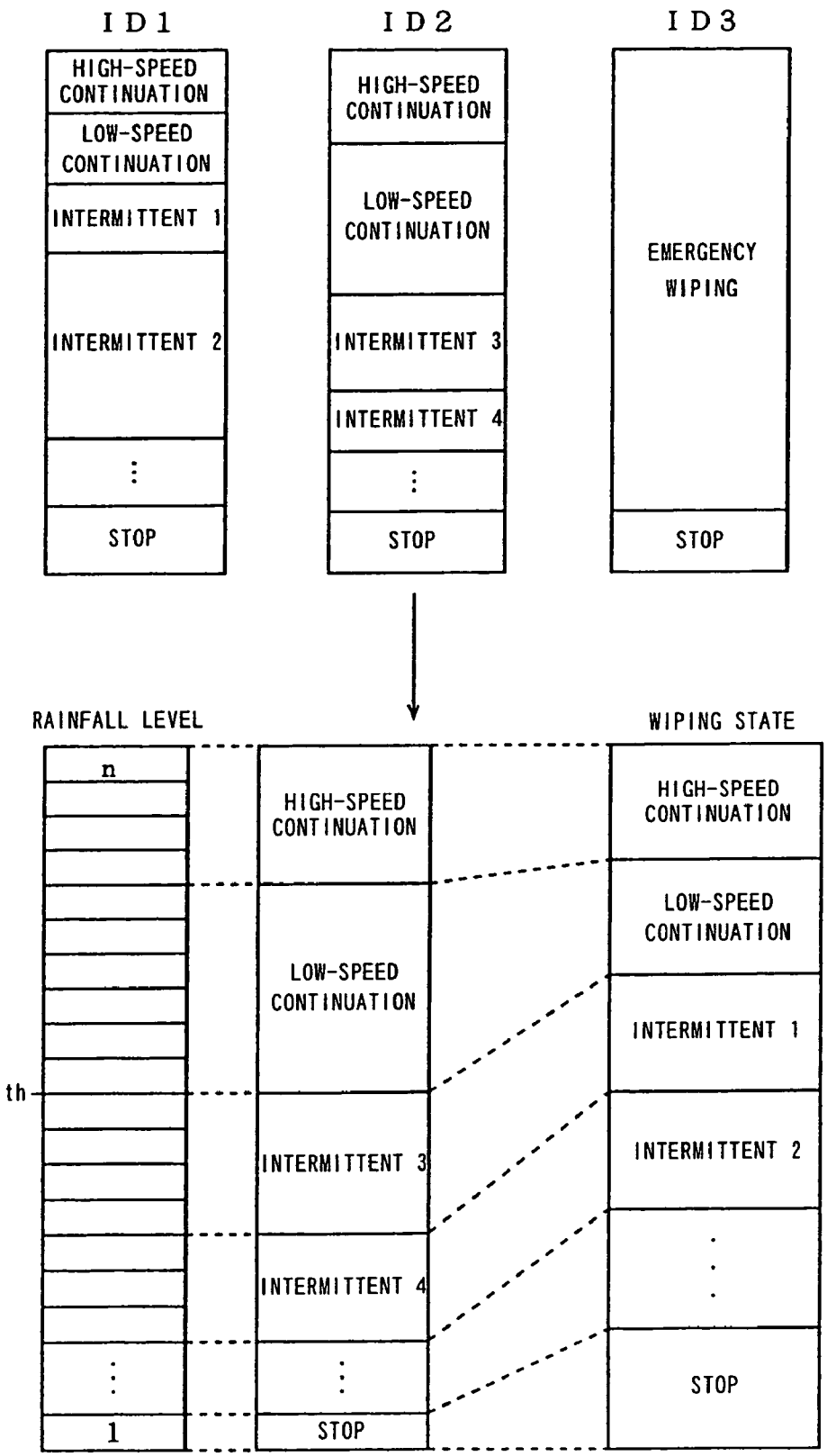
FIG. 9 is a conceptual diagram for explaining a dynamic link method.

Next, the wiping sate control part 42 will be described. FIG. 6 is a block diagram for explaining the configuration of the wiping state control part, FIGS. 7 and 8 are conceptual diagrams for explaining a method for scene determination and FIG. 9, 10 are conceptual diagrams for explaining a method of dynamic link.

As shown in FIG. 6, the wiping state control part 42 has a scene dissolution part 44 and a link part 46. The scene dissolution part 44 determines such a driving scene that a vehicle enters a tunnel from a predetermined rainfall situation from the rainfall level generated by the rainfall level generation part 32, car speed information detected by the vehicle information detection part 24 and auto light information and adjusts the correspondence between a predetermined rainfall level and a predetermined wiping level. As an example of such adjustment, a link pattern for linking Table 1 (rainfall level) with Table 2 (wiping state) as shown in FIG. 4 is determined, and ID is outputted as identification information for identifying the determined link pattern.

The link part 46 selects a specific link pattern based on the identification information outputted by the scene dissolution part 44 from a plurality of link patterns and links the rainfall level items and the wiping level items with the selected link pattern. In concrete, the link pattern to be selected associates the rainfall level at a predetermined threshold value or more to a higher wiping level and the rainfall level less than the predetermined threshold value to a lower wiping level.

(Scene Dissolution Part)

Next, the scene dissolution part will be described. As shown in FIG. 7, the scene dissolution part 44 includes a status control part 441, an entity scheduler 442, a pattern table control part 444 and a pattern scheduler 446.

The status control part 441 controls status comprised by a current vehicle state and a current driving environment state. In concrete, the current vehicle state (stop, driving, acceleration, deceleration, etc.) is determined from the car speed information. Also, the current driving environment state is determined from the rainfall level, auto light information, etc.

The driving environment state is, for example, a rainfall state (fair weather state, rainy state), a light/dark state, inside a tunnel, etc. This rainfall state is determined from the rainfall level. Also, the light/dark state is determined from the auto light information, position information of light switch, etc., for example.

The status control part 441 selects a current status from a status information table as shown in FIG. 8 with the determined current vehicle state and the current driving environment state as a reference. In Table of FIG. 8, different statuses are set to the respective addresses, and each of the addresses is linked to the entity information and the pattern table information. Therefore, the status control part 441 selects one address according to the combination of the vehicle state and the driving environment. When the status is changed, the address of the changed status is selected.

Next, the entity scheduler 442 starts only an entity 443 liked to the status determined by the status control part 441 from the plurality of entities. As shown in FIG. 8, specific entity information is linked to each of the status addresses, and only the entity 443 linked to the current status is identified and started. In concrete, by the entity ID included in the entity information, one or plural specified entities are identified and started.

Next, the pattern table control part 444 selects and sets a pattern table 445 linked to the status determined by the status control part 441 from a plurality of pattern tables. As shown in FIG. 8, specific pattern table information is linked to each of the status addresses, and only the pattern table 445 linked to the current status is identified and set as an object to be monitored. In concrete, by the pattern table ID included in the pattern table information, one or plural specified pattern tables are identified and selected.

It is preferable that entities are provided in plural in accordance with the number of events to be detected. Also, it is preferable that each of the entities monitors a specific event. For example, an acceleration detection entity detects an event of vehicle acceleration. Also, a fair weather state detection entity detects an event that rain has stopped and it is cleared up. A tunnel entrance detection entity detects an event of entrance of a vehicle to a tunnel. And according to the status, only a specific entity among the plurality of entities is started by the entity scheduler 442. Each of the entities included in the started entity 443 has a function to detect occurrence of a predetermined event and to register the detected event in a set pattern table 445.

Such detection of events can be made from temporary rainfall level information, car speed information, auto light information, etc. Also, the entity has a timer and can detect an event established including a concept of time such as an event that a specific state (stop of rainfall, for example) lasts for a predetermined period of time or an event that the rainfall level or the like is changed by a predetermined amount in a predetermined period of time.

Each of the pattern tables corresponds to a specific link pattern, respectively, and provided in the same number as that of the link patterns. Each of the pattern tables has a pattern of event registration block corresponding to a driving scene to be determined, and when all the event registration blocks are filled in a specific pattern table, the specific driving scene is detected. Such pattern tables are preferably provided in plural according to the driving scenes to be detected. From the plurality of pattern tables, a predetermined pattern table is selected by the pattern table control part 444 and set as an object to be monitored.

The pattern table 445 set by the pattern table control part 444 has one or plural event registration blocks for registering events. Then, various specific patterns are set by masking arbitrary blocks. Or specific patterns may be set by adding identification information such as ID to identify specific events to each of the event registration blocks so that only the specific events are registered.

Operation of the entity started in this way and the pattern table set as an object to be monitored will be described. As shown in FIG. 7, when a specific entity detects its own event, the event is registered in the pattern table. At this time, the entity can register the event only for the event registration block allocated to the event. Therefore, some events may be registered in all the pattern tables, while others may be registered only in one pattern table.

Next, the pattern scheduler 446 monitors the set pattern table, detects the pattern table in which events are registered in all the event registration blocks and outputs the ID given to the detected pattern table. This ID is information for identifying the link table. The pattern scheduler 446 may be combined with the above-mentioned pattern table control part 444 so that one pattern scheduler has both functions.

Next, the link part 446 selects a specific link pattern based on the ID outputted by the pattern scheduler 446, as shown in FIG. 9, and links the rainfall level items to the wiping state items by the selected link pattern. As shown in FIG. 9, different correspondence patterns are set for each of the link patterns, and by selecting an appropriate link pattern according to the driving scene, correspondence can be adjusted appropriately.

Figure 10:
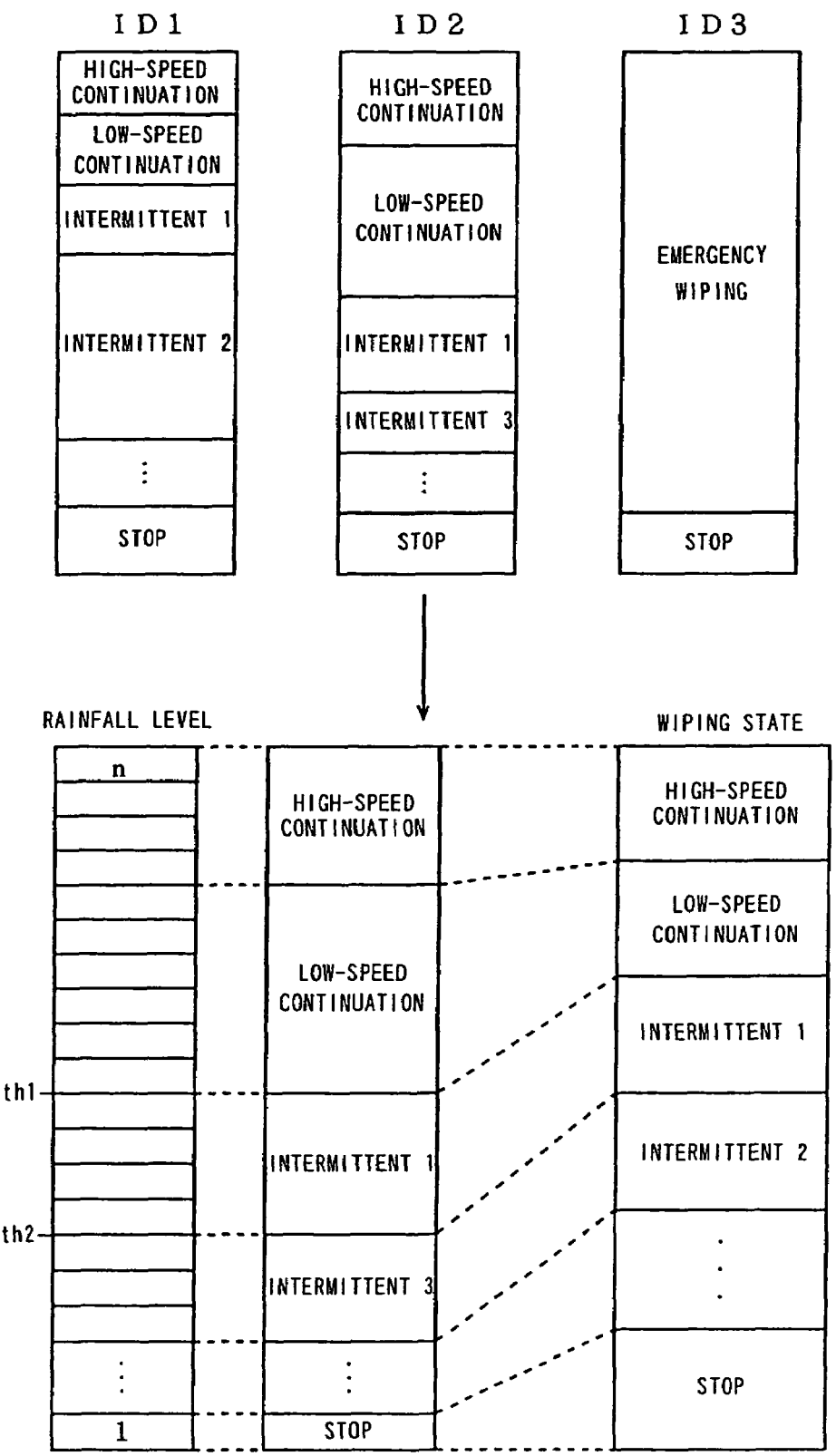
FIG. 10 is a conceptual diagram for explaining a dynamic link method.

A link pattern selected in the case where a vehicle enters a tunnel from a certain rainfall situation will be described. In this link pattern, as shown in FIG. 9, the rainfall level at a predetermined threshold value th or more may be allocated to continuous wiping and the rainfall level less than the predetermined threshold value th to a longer intermittence time of intermittence time 3 or less. For example, as shown in FIG. 10, the rainfall level not smaller than a first threshold level th1 is allocated to continuous wiping and the rainfall level less than a second threshold level th2 to a long intermittence time of intermittence time 3 or less. Particularly, in a tunnel, it is preferable that the wiping frequency is increased quickly for rainfall more than a predetermined amount in preparation for exit.

In the above explanation, it is so constituted that the entity scheduler 442 is provided and only the necessary entity is started for the current status. However, by constituting so that the event registration block of the pattern table accepts only specific events, all the entities may be operated at the same time. Therefore, the entity scheduler 442 may be omitted in the configuration.

However, by providing the entity scheduler 442, the same control can be realized by limiting the number of entities operating at the same time. This is because the event to be monitored will change according to the status and it is not necessary to operate all the entities at the same time. When the status is a driving state, for example, the event of stop should be detected, but the entity to detect the event of start from stop is not required. Also, when the status is the fair weather state, the event to be detected is start of rain, adhesion of mist, continuation of fair weather, etc., and the entity to detect the event of stop of rainfall does not need to be operated.

By providing the entity scheduler 442 in this way, the number of simultaneously operating entities can be reduced, which enables reduction of resources required for processing.

Operation of the First Preferred Embodiment

Figure 11:
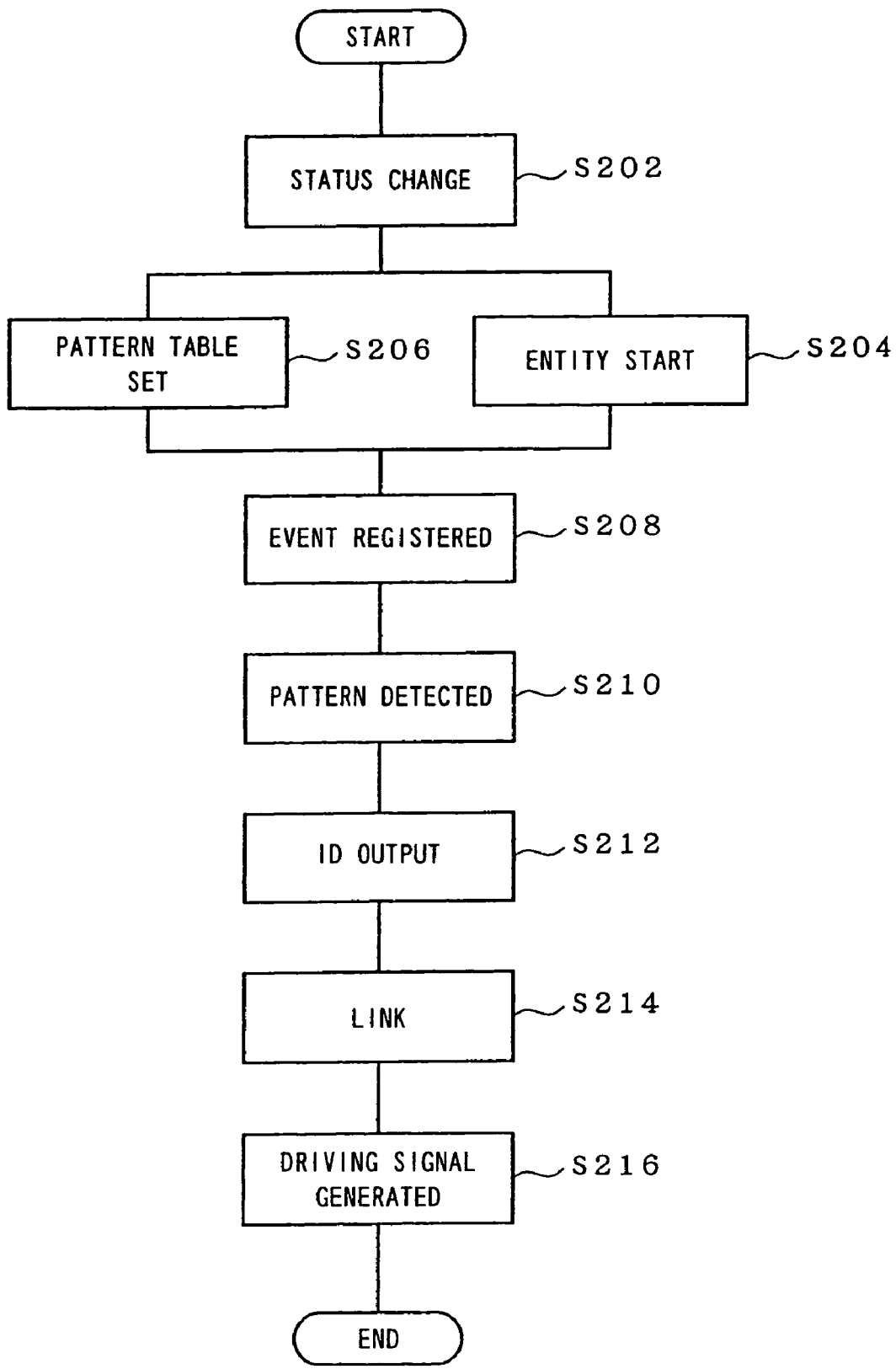
FIG. 11 is a flowchart for explaining operation of the first preferred embodiment.

Next, operation of the first preferred embodiment of the present invention will be described referring to FIG. 11. FIG. 11 is a flowchart for explaining the operation of the first preferred embodiment. First, at Step 202, the status control part 441 determines the current status and selects the applicable address of the status information table. For example, when the rainfall level is changed, it is preferable to determine this by the reference rainfall level. That is because rainfall in the nature will change, and if a status is changed following a temporary change, behavior of the wiper will become unstable. Therefore, the status is changed at the stage that the reference rainfall level is changed from fair weather to a specific rainfall level, for example.

For example, as a status before entrance to a tunnel, a rainfall level not smaller than a predetermined threshold value is selected. Also, if car speed information is provided, a status with a constant driving speed is selected.

Next, at Step 204, the entity scheduler 442 receives the entity information linked to the address of the status information table selected by the status control part 441 and identifies and starts the specified entity. The entity started here is an entity to detect an event that the rainfall level is lowered by a predetermined amount in a predetermined time and this lowered state lasts for a predetermined period of time. Also, if auto light information is provided, an entity is started to detect an event that the auto light system determines turning-on of head lights (including front position lights) upon entrance to the tunnel.

In parallel with this, at Step 206, the pattern table control part 444 receives the pattern table information linked to the address of the status information table selected by the status control part 441 and selects the specified pattern table and sets it as an object to be monitored. The pattern table selected here is a pattern table having an event registration block for registering an event to be detected by the entity started at Step 204.

Next, at step 208, the entity having been started detects its own event and registers the detected event in the pattern table. When registering the event, only the event registration blocks to which the event is allocated are used. Such detection of events and registration of detected events are performed at each entity when there are a plurality of entities. Here, an event that the rainfall level is lowered by a predetermined amount in a predetermined time and this lowered state lasts for a predetermined period of time is detected and registered.

Next, at Step 210, the pattern scheduler 446 detects the pattern table in which events have been registered in all the event registration blocks. At Step 212, the ID allocated to the detected pattern table is outputted. Here, a pattern table is detected with such an event registered that the rainfall level is lowered by a predetermined level in a predetermined time and this lowered state lasts for a predetermined period of time, and a driving scene that a vehicle enters a tunnel from a predetermined rainfall state is determined.

At Step 214, the link part 46 selects a specified link pattern from a plurality of link patterns based on the ID outputted by the pattern scheduler 446 and links the rainfall level table to the wiping state table by the selected link pattern. Here, as shown in FIG. 9, for example, the rainfall level not smaller than the predetermined threshold level th is allocated to continuous wiping and the rainfall level less than the predetermined threshold value th to a long intermittence time of intermittence 3 or less.

Next, at Step 216, the wiper driving signal generation part 48 applies the temporary rainfall level generated by the rainfall level generation part 32 to a rainfall level table as shown in FIG. 9, determines the wiping state of the wiper by selecting a specific wiping level associated with the rainfall level and outputs a wiper driving signal of a predetermined wiping waiting time and a predetermined wiping speed. Here, a low wiping level (long intermittence time) is selected as the rainfall level less than the threshold value th for adhesion of splashing in the tunnel. On the other hand, in the case of continuous adhesion of raindrops with a large diameter at the exit of the tunnel, a high wiping level (continuous wiping) is selected as the rainfall not smaller than the threshold value th.

In this way, according to the first preferred embodiment of the present invention, such a driving scene that a vehicle enters a tunnel from a predetermined rainfall situation by occurrence of a specific event is determined, and a link pattern corresponding to this driving scene can be selected. Also, using this link pattern, the wiping level is set low for the low level of rainfall less than the predetermined rainfall level and the wiping level is set high for the high level of rainfall at the predetermined rainfall level or more so that change of rainfall situation at passage through a tunnel can be followed.

In the first preferred embodiment, processing to return the pattern table to that before entrance to the tunnel may be executed by detecting the event that a predetermined time has elapsed from exit from the tunnel. That is because the driver is accustomed to the rainfall situation after a predetermined time has elapsed from the exit from the tunnel and the same wiper operation as before entrance to the tunnel begins to match the sense of the driver.

Second Preferred Embodiment

Next, a second preferred embodiment of the present invention will be described. The above-mentioned first preferred embodiment adjusts correspondence between the rainfall level and the wiping level, while the second preferred embodiment of the present invention adjusts detection sensitivity of raindrops.

Figure 12:
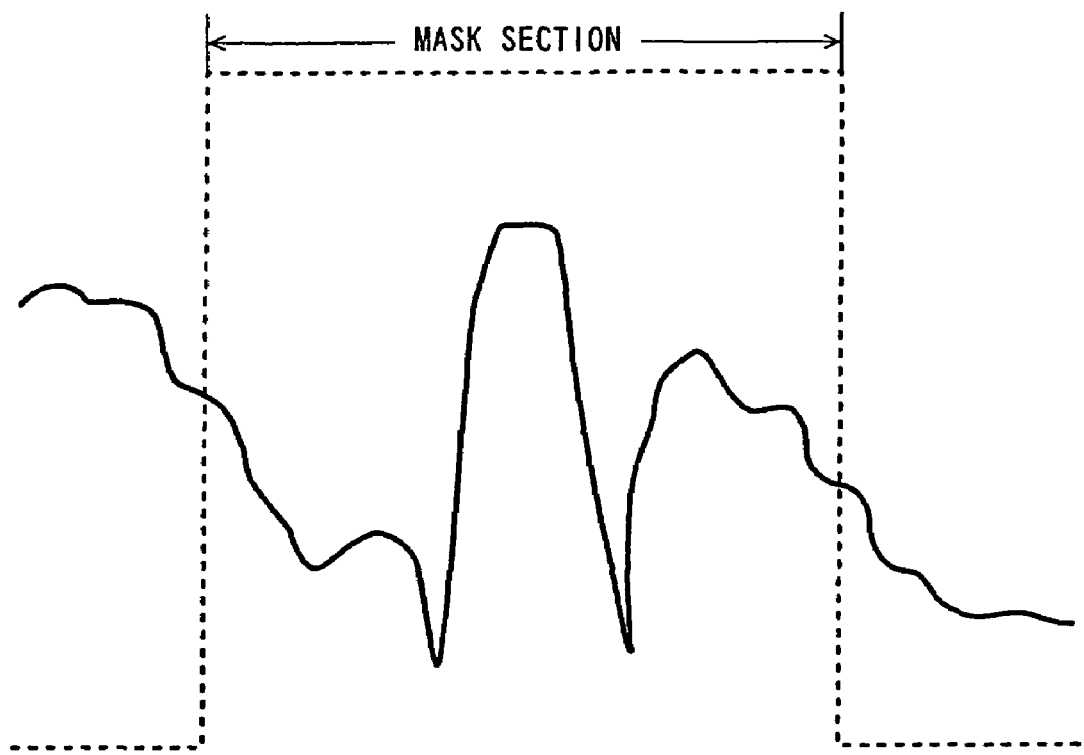
FIG. 12 is a diagram for explaining a waveform model of an output signal of the light receiving element.

First, in a rainfall situation with rainfall more than predetermined, a waveform of an output signal of a light receiving element when a vehicle running at a high speed of about 100 km/h exits from a tunnel will be described. FIG. 12 is a diagram for explaining the waveform model of the output signal of the light receiving element and shows a model of the signal waveform when the wiper performs the first wiping after exit from the tunnel.

In FIG. 12, when adhesion of raindrops after exit from the tunnel is detected, the wiper is driven to perform the first wiping. By this first wiping, the raindrops adhering on the detection surface are eliminated and the signal level is recovered. However, since new raindrops adhere on the detection surface during the mask section and a water film is formed, the signal level drops after completion of the mask section.

In general, the signal change when the wiper blade passes through the detection surface is extremely large. Therefore, the signals are masked and removed from the objects to be detected at passage of the wiper blade (wiper driving section). Then, the raindrop detection processing is resumed at the point of time when the mask section is finished. However, in the state that the signal level drops in this way, resolution is lowered and even when raindrops with a large diameter adhere, the signal change is hardly generated.

In this way, after the vehicle exits from the tunnel and the first wiping is performed, raindrops cannot be detected easily as before the first wiping in some cases. In the meantime, in the rainfall situation that raindrops with a large diameter continuously adhere, particularly at the exit of the tunnel, it is desirable to detect the raindrops surely and perform continuous wiping quickly.

The inventors obtained the finding that in the situation with rainfall more than predetermined, when a vehicle exits from a tunnel at a high speed more than predetermined, it is desirable to increase detection sensitivity so that micro change of the light receiving element output can be captured. The second preferred embodiment of the present invention is to increase the detection sensitivity for the raindrops adhering on the detection surface by determining the driving scene that a vehicle enters a rainfall shutoff environment such as a tunnel from a predetermined rainfall situation.

Figure 13:
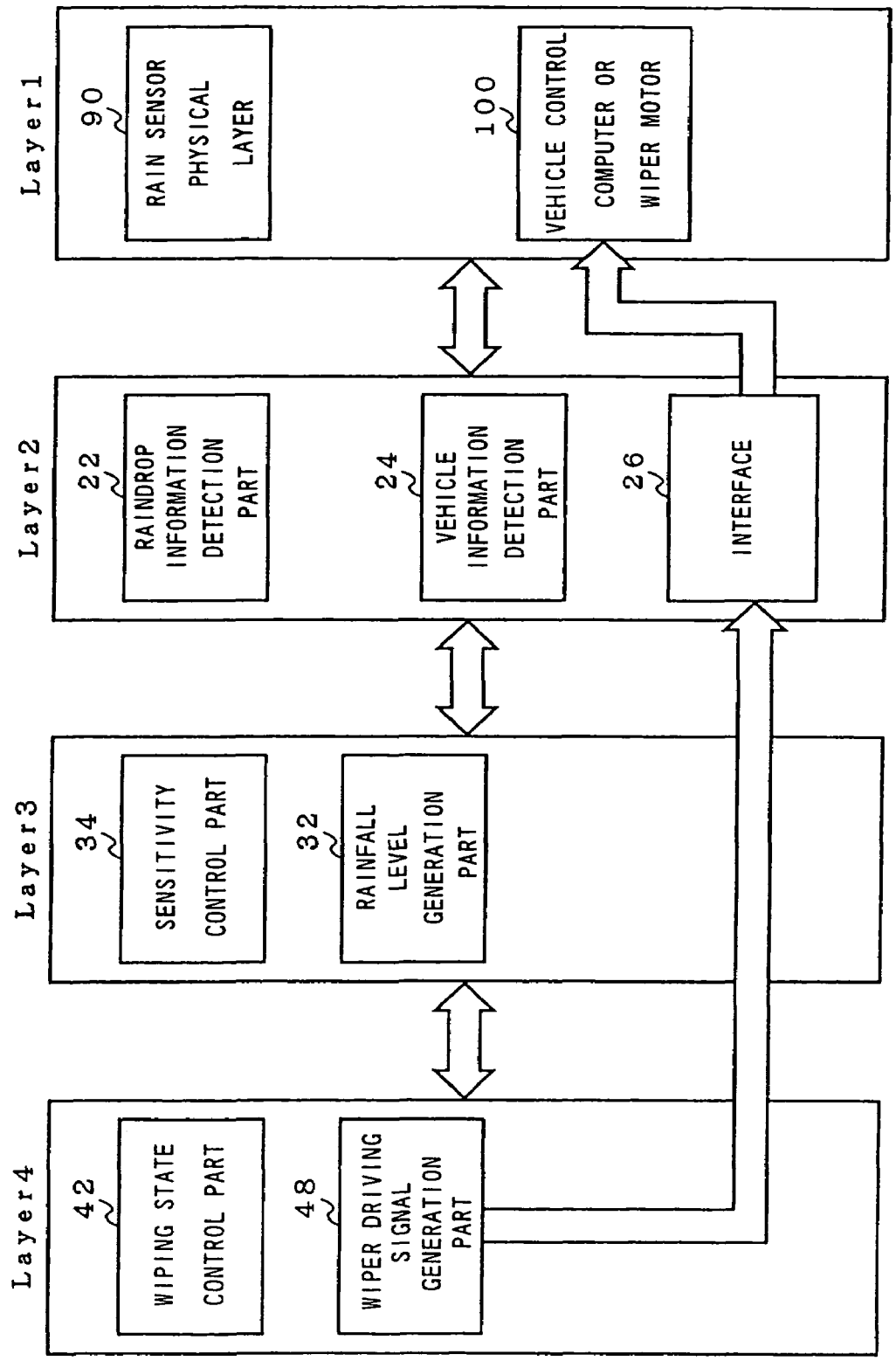
FIG. 13 is a block diagram for explaining the configuration of a wiper control device according to a second preferred embodiment of the present invention in the layered structure.

Next, the configuration of the second preferred embodiment of the present invention will be described referring to FIG. 13. Here, FIG. 13 is a block diagram for explaining the configuration of the wiper control device according to the second preferred embodiment of the present invention in the layered structure. In FIG. 13, the wiper control device according to the second preferred embodiment of the present invention can be represented by the configuration of four layers.

The same configuration as shown in the above first preferred embodiment is given the same reference numerals and detailed description will be omitted. In this second preferred embodiment, the third layer includes the rainfall level generation part 32 and a sensitivity control part 34. Each of the parts can be realized by software.

The sensitivity control part 34 controls detection sensitivity for raindrops adhering on the detection surface according to the result of determination of the driving scene by the above-mentioned wiping state control part 42. In concrete, when the wiping state control part 42 determines the driving scene that a vehicle enters the rainfall shutoff environment such as a tunnel from a certain rainfall situation, the detection sensitivity may be increased based on this determination. Or, the wiping state control part 42 may output the above-mentioned ID according to the determination of the driving scene and the sensitivity control part 34 receives this ID and increase the detection sensitivity.

As a method for increasing the detection sensitivity for raindrops adhering to the detection surface, a small change in the signal waveform may be captured by lowering the threshold value for the signal change generated by adhesion of raindrops, for example. Alternatively, the rainfall level allocated to a small signal change may be increased.

Also, under the condition that a vehicle is running at a high speed more than predetermined, the following adjustment of detection sensitivity may be made. For example, the wiping state control part 42 detects that the vehicle is in the predetermined high-speed running state based on car speed information and setting this as a condition, it may give instruction to the sensitivity control part 34. The event that the vehicle is in the high-speed running state can be detected by the above-mentioned entity, and they may be registered in a pattern table.

By constituting in this way, in the second preferred embodiment of the present invention, when a vehicle is running at a high speed more than predetermined and exits from a tunnel and enters a situation of heavy rain to some extent, a required wiping state quickly following the rainfall situation can be realized.

In the second preferred embodiment, processing to return the detection sensitivity to that before entrance to the tunnel may be executed by detecting the event that a predetermined time has elapsed from exit from the tunnel. That is because the driver is accustomed to the rainfall situation after a predetermined time has elapsed from the exit from the tunnel and the same wiper operation as before entrance to the tunnel begins to match the sense of the driver.

Third Preferred Embodiment

Figure 14:
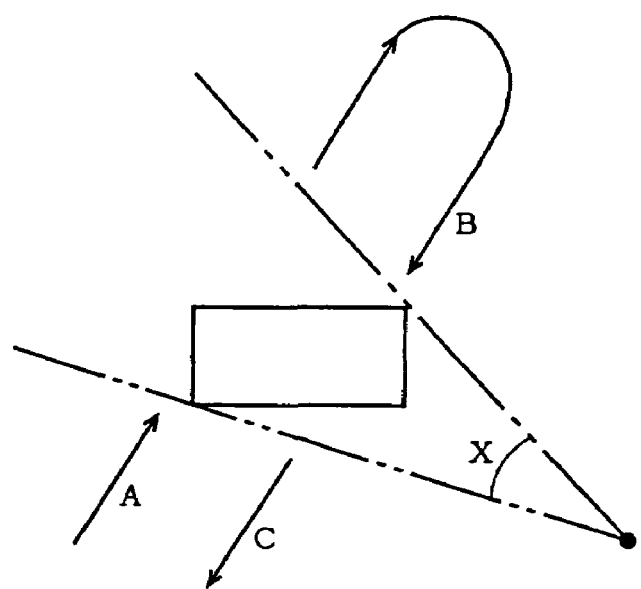
FIG. 14 is a diagram for explaining operation of the wiper when a wiper blade passes a detection surface.
Figure 15:
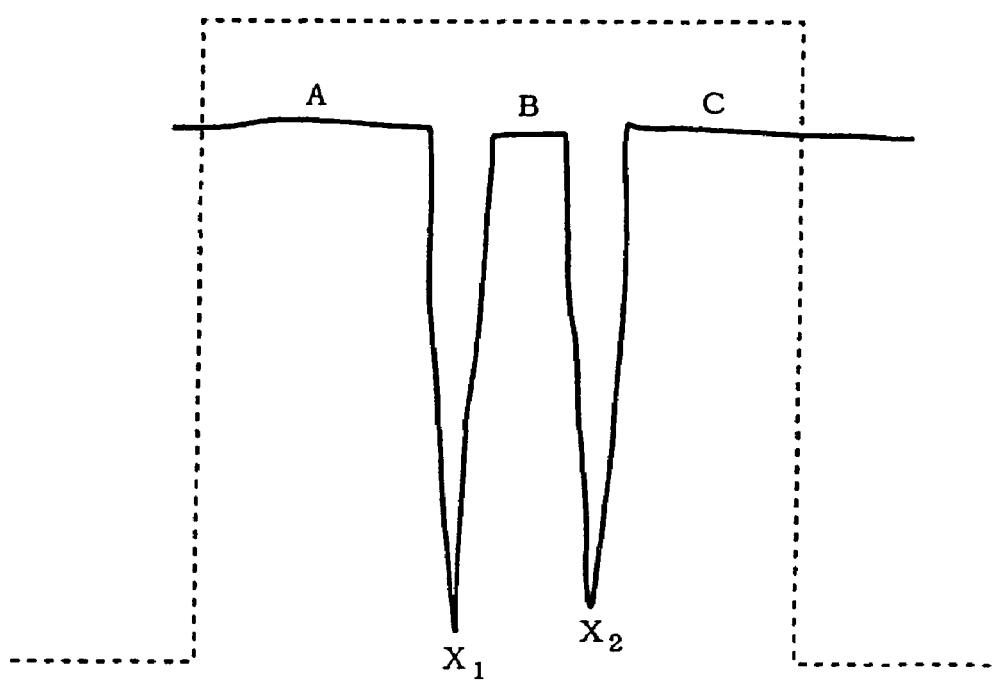
FIG. 15 is a diagram showing a waveform model of an output signal of the light receiving element when the wiper blade passes the detection surface in the case of no adhesion of raindrops.

Next, a third preferred embodiment of the present invention will be described. FIG. 14 is a diagram for explaining operation of the wiper when the wiper blade passes through the detection surface. FIG. 15 is a diagram showing a waveform model of the output signal of the light receiving element when the wiper blade passes through the detection surface in the case of no adhesion of raindrops. As shown in FIG. 14, the wiper blade passes through the detection surface by outgoing motion, reverses after passing through the detection surface, starts return motion, passes through the detection surface and returns to the original position.

Next, the waveform model of FIG. 15 will be described. In FIG. 15, the waveform in the mask section is divided into some sections according operation of the wiper. That is, they are a signal A till the wiper blade passes through the detection surface on the outgoing path, a signal $X_1$ when passing through the detection surface on the outgoing path, a signal B from reversal of the wiper blade after passing through the detection surface to passage through the detection surface again, a signal $X_2$ when passing through the detection surface on the return path and a signal C after passing through the detection surface on the return path.

Figure 16:
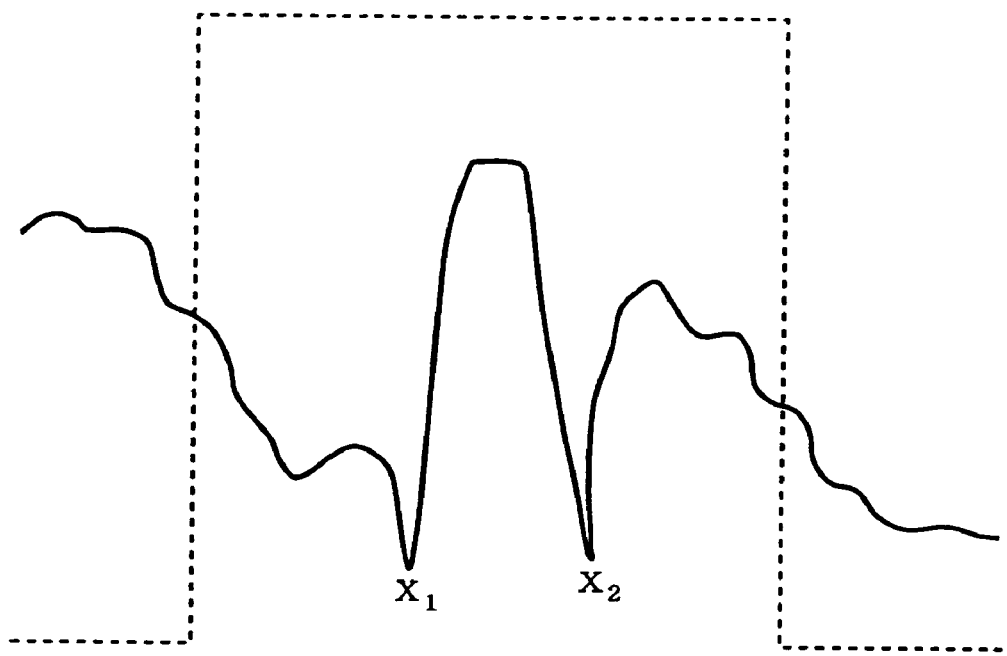
FIG. 16 is a diagram for explaining a waveform model of an output signal of the light receiving element.
Figure 17:
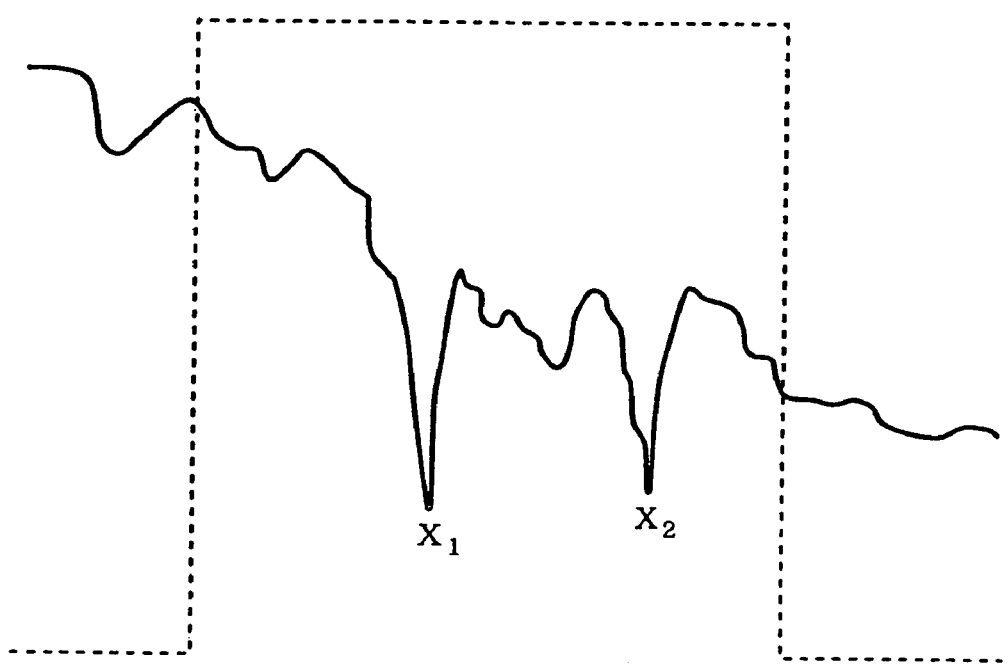
FIG. 17 is a diagram for explaining a waveform model of an output signal of the light receiving element.

Next, the waveform of the output signal of the light receiving element when a vehicle running at a high speed of about 100 km/h exits from a tunnel in the rainfall situation of heavy rain requiring continuous wiping of the wiper will be described. FIGS. 16 and 17 are diagrams for explaining the waveform model of the output signal of the light receiving element and show a model of the signal waveform when the wiper performs the first wiping after exit from the tunnel.

First, in FIG. 16, a model of the signal waveform in the rainfall situation generally considered as heavy rain is shown. For the signal waveform of this rainfall situation, the inventors obtained the following finding. That is, a large motion appears in the signal waveform in the sections A and C. As mentioned in the second preferred embodiment, at the point when the mask section is finished, signal change hardly appears.

Next, in FIG. 17, a model of the signal waveform in the rainfall situation generally considered as rainstorm whose rainfall is further larger than the heavy rain in FIG. 16 is shown. For the signal waveform of this rainfall situation, the inventors obtained the following finding. That is, a large motion appears in the signal waveform in the sections A, B and C.

Based on the above finding, it was found out that in the rainfall situation of heavy rain requiring continuous wiping of the wiper, a large motion appears in the signal waveform at least in the sections A and C. On the other hand, as shown in FIG. 15, in the case of no adhesion of raindrops, no motion appears in the signal waveform in any of sections A, B or C. The third preferred embodiment of the present invention is to use such momentum of the signal waveform in the mask sections. The third preferred embodiment of the present invention is to detect raindrops from the output signal of the light receiving element in the mask section by determining the driving scene that a vehicle enters the rainfall shutoff environment such as a tunnel from a predetermined rainfall situation.

Next, a method for detecting raindrops from the signal waveform in the mask section will be described. In the third preferred embodiment of the present invention, adhesion of raindrops may be detected by comparing the momentum of the signal waveform in the mask section in the tunnel with the momentum of the signal waveform in the mask section after exit from the tunnel. The above-mentioned fluctuation of raindrops may be used for the evaluation of the momentum of the signal waveform.

For example, as a momentum of the signal waveform, length of signal fluctuation, the number of change times of increase/decrease in the signal fluctuation, change amount of the increase/decrease and direction of increase/decrease of the change may be used. The length of fluctuation included in the signal fluctuation in the mask section in the tunnel, the number of change times of increase/decrease, the change amount of increase/decrease, etc. are acquired as the momentum of the signal waveform in the mask section in the tunnel. Next, the length of fluctuation included in the signal fluctuation in the mask section after exit from the tunnel, the number of change times of increase/decrease, the change amount of increase/decrease, etc. are acquired as momentum of the signal waveform in the mask section after exit from the tunnel. Adhesion of raindrop after exit from the tunnel may be detected by comparing both of them.

In concrete, the wiping state control part 42 determines the driving scene that a vehicle enters the rainfall shutoff environment such as a tunnel from a certain rainfall situation. Since the vehicle is running in the tunnel at the time of this determination, the wiping state control part 42 next acquires the momentum of the signal waveform in the mask section and stores it. The wiping state control part 42 acquires the momentum of the signal waveform in the mask section at every wiping, compares it with the stored momentum and detects raindrops. In concrete, determination is made based on whether the length of fluctuation, number of change times of increase/decrease, the change amount of increase/decrease, etc. are larger than the momentum in the tunnel by a predetermined amount or not, and if larger by the predetermined amount, it may be detected as adhesion of raindrops. Also, the wiping state may be determined according to the amount exceeding the momentum in the tunnel.

Another method for detecting raindrops will be described. As another method for detecting raindrops, adhesion of raindrops may be detected in the signal waveform in a mask section under the condition that a predetermined momentum has been detected at least in the above A and C sections.

Figure 18:
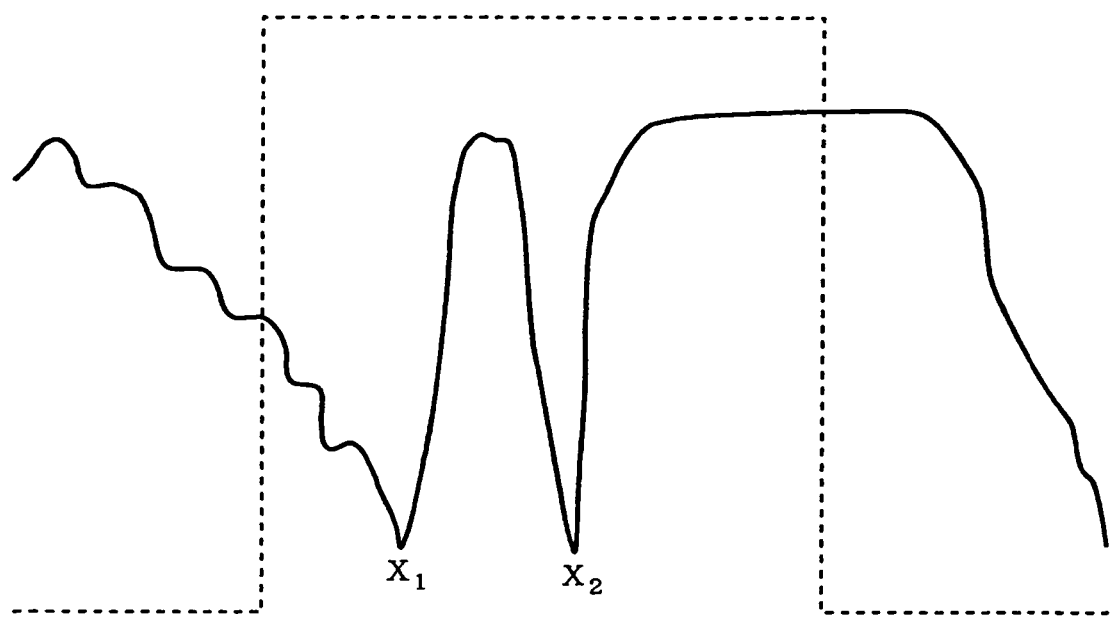
FIG. 18 is a diagram for explaining a waveform model of an output signal of the light receiving element when dropping water passes the detection surface.
Figure 19:
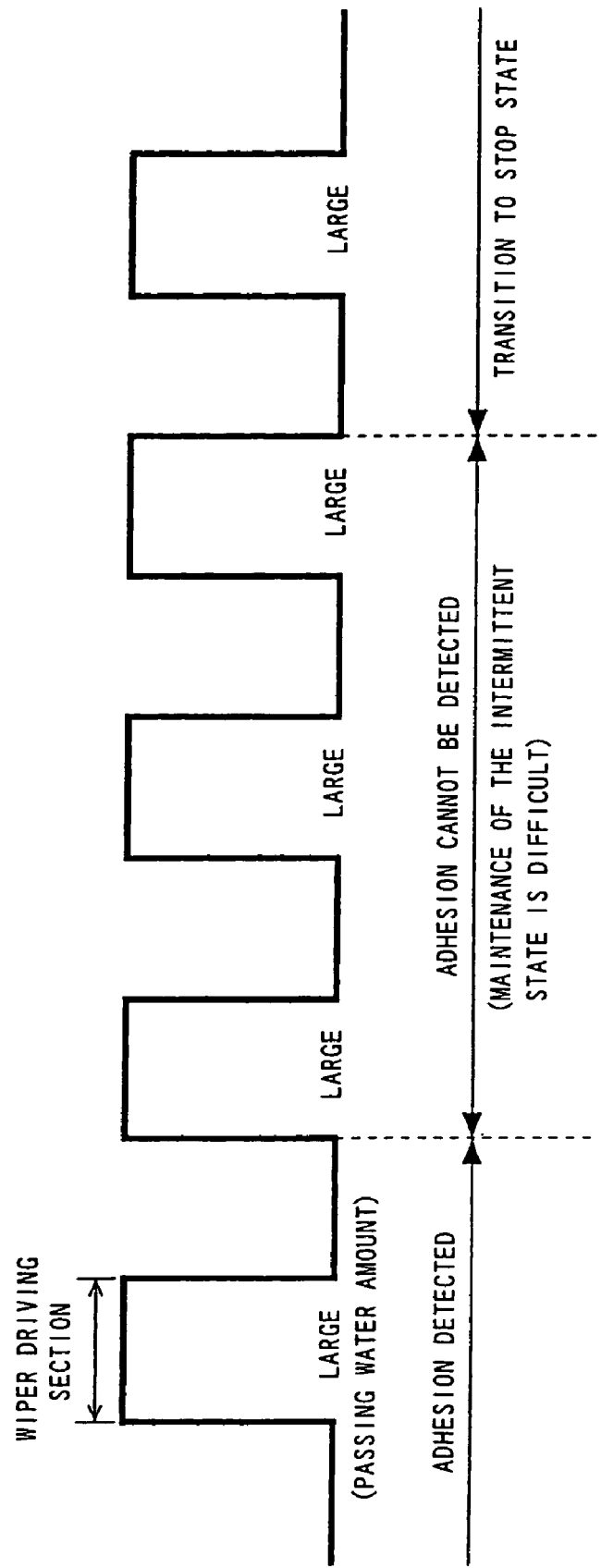
FIG. 19 is a conceptual diagram for explaining control of the wiping state based on adhesion of raindrops.

At exit from the tunnel, a phenomenon that water is dripping from the roof of a vehicle or the like (hereinafter referred to as dripping water) can be observed. Such dripping water is temporary in many cases, it is not necessary to continue continuous wiping as in the rainfall case. FIG. 18 shows a waveform model of an output signal of a light receiving element when the dripping water passes through the detection surface. A finding was obtained that the signal waveform when the dripping water passes through the detection surface appears as a large momentum in the signal waveform only in the section A.

Therefore, as mentioned above, when adhesion of raindrops is detected under the condition that momentum has been detected at least in the above A and C sections, the dripping water case can be excluded and unnecessary continuous wiping can be prevented.

As concrete processing, the wiping state control part 42 determines the driving scene that a vehicle enters the raindrop shutoff environment such as a tunnel from a certain rainfall situation. Next the wiping state control part 42 determines if momentum is generated in the sections A and C for the signal waveform in the mask section. And when the momentum is generated in the sections A and C, adhesion of raindrops is detected so as to determine the wiping state according to the momentum.

In this way, in the third preferred embodiment of the present invention, even in the rainfall situation where change hardly appears in the output signal after completion of the mask section, adhesion of raindrops can be surely detected for the output signal of the light receiving element in the mask section. Also, by performing detection for the output signal of the light receiving element in the mask section, wiping can be realized more quickly when compared with the case where the detection processing is started after completion of the mask section.

In the third preferred embodiment, processing may be executed by detecting an event that a predetermined time has elapsed from exit from the tunnel and excluding the output signal of the light receiving element in the mask section from the objects for raindrop detection.

Fourth Preferred Embodiment

Figure 20:
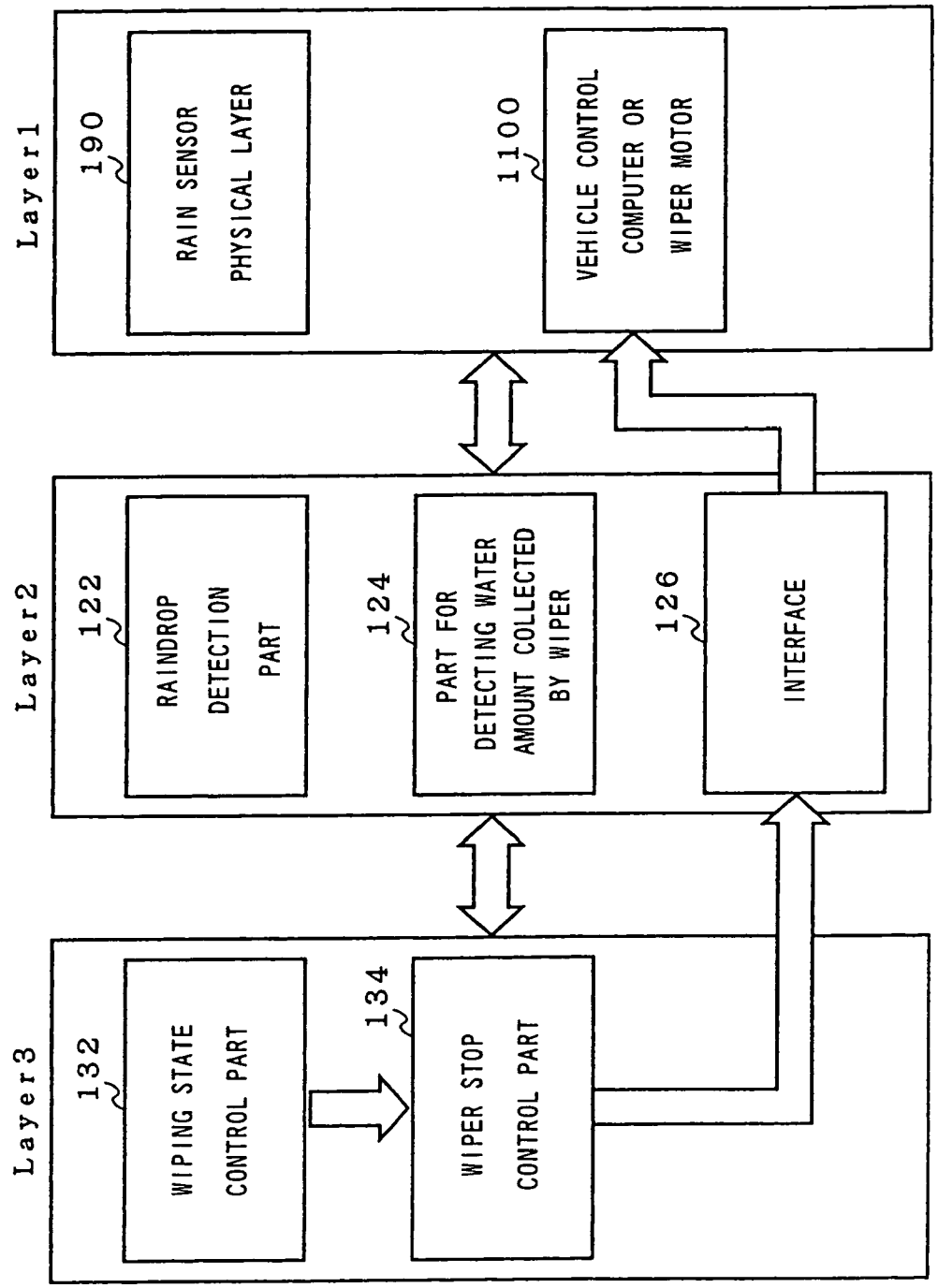
FIG. 20 is a block diagram for explaining the configuration of a wiper control device according to a fourth preferred embodiment of the present invention in the layered structure.

The configuration of a wiper control device according to the fourth preferred embodiment of the present invention will be described referring to FIG. 20. FIG. 20 is a block diagram for explaining the configuration of the wiper control device according to the fourth preferred embodiment of the present invention in the layered structure. In FIG. 20, the wiper control device according to the fourth preferred embodiment of the present invention can be represented by three-layered construction, and between each of the layers, data or signals are made to communicate through a common interface such as SAP (service access point), for example. A first layer includes a rain sensor physical layer 190 and a vehicle control computer or a wiper motor 1100, a second layer includes a raindrop detection part 122, a detection part 124 for a water amount collected by a wiper and an interface 126, a third layer includes a wiping state control part 132 and a wiper stop control part 134. Each of them can be realized by software.

The rain sensor physical layer 190 is comprised by an optical mechanism and a circuit, the optical mechanism being, for example, in the method that light from a light emitting element is reflected by a detection surface and a reflected light is received by a light receiving element and the circuits such as a filter circuit for processing output of the light receiving element, an amplifier circuit, an A/D converter, etc. An example of such a rain sensor is disclosed in the JP-A-2001-180447 and the JP-A-2002-277386.

Figure 21:
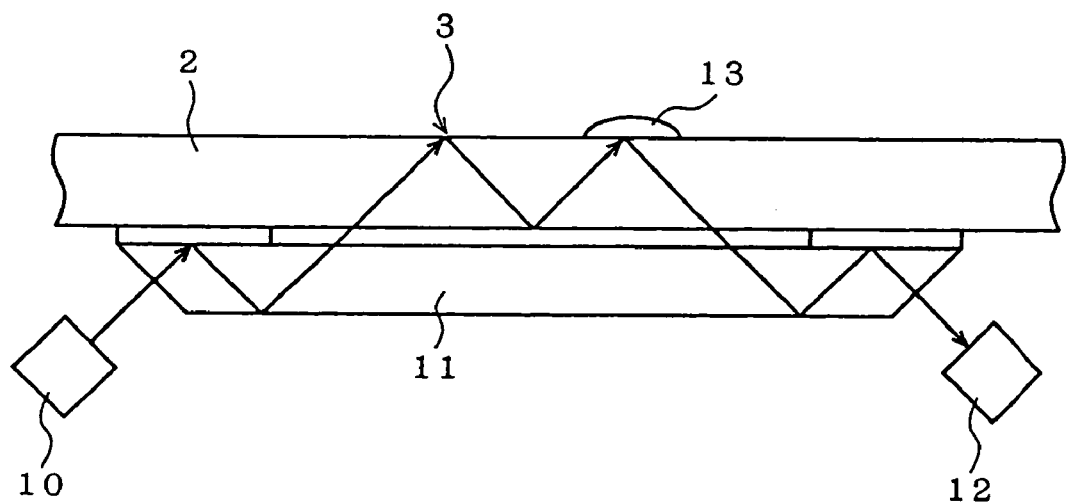
FIG. 21 is a configuration diagram for explaining the configuration of an optical mechanism.

The optical mechanism will be described using FIG. 21. FIG. 21 is a configuration diagram for explaining the configuration of the optical mechanism. As shown in FIG. 21, light emitted from a light emitting element 10 such as an LED, for example, is led to a glass substrate (windshield glass) 2 which is a transparent substrate to detect water drops through a prism glass 11 or the like. The led light is fully reflected by the surface to be detected 3 and enters a light receiving element 12 such as a photodiode, for example, through the above prism glass 11. The optical mechanism in this Fig. is arranged/constituted so that in the state of no adhesion of water drop or the like, the maximum output is generated at the light receiving element. At this time, if there is adhesion 13 of a water drop or the like on the detection surface, the output of the light receiving element is lowered.

Next, the position of the detection surface on the windshield glass will be described referring to FIG. 22. Here, FIG. 22 is a view showing the installation positions of the detection surface on the windshield glass and the wiper control device.

Figure 22:
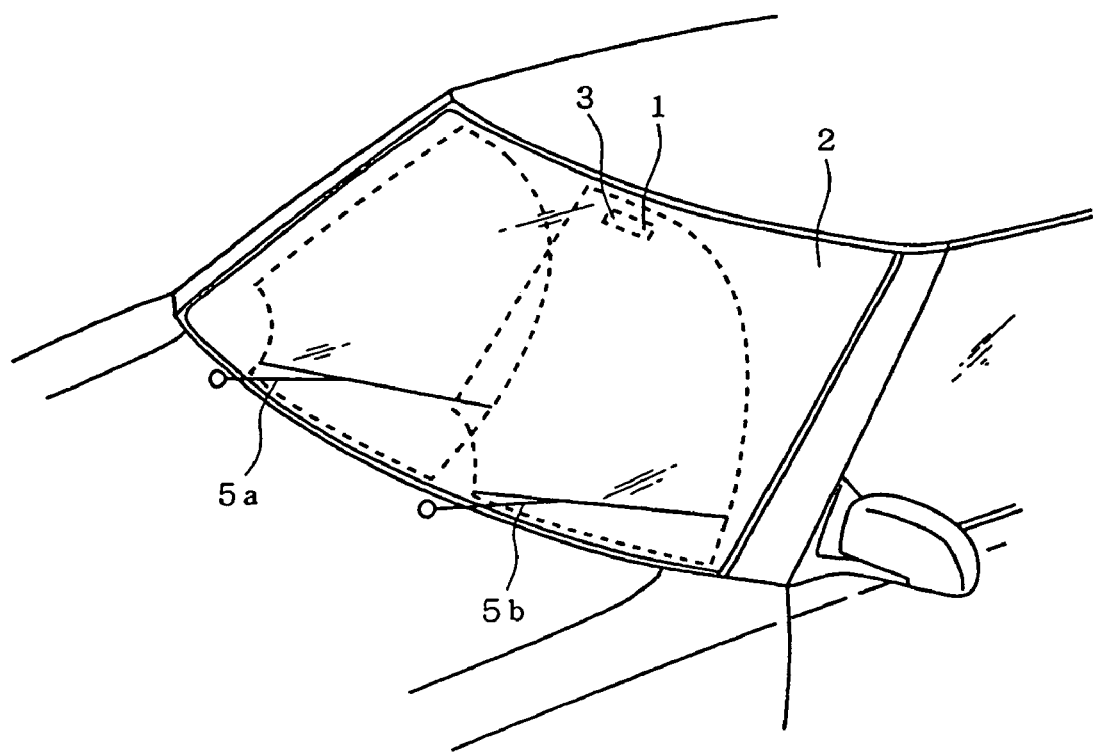
FIG. 22 is a diagram showing installation positions of the detection surface on the windshield glass and the wiper control device.

As shown in FIG. 22, the wiper control device 1 has a part of the outer surface of the windshield glass 2 as the detection surface 3 and is mounted on the inner side of the windshield glass 2 of an automobile by an adhesive or the like, not shown. The installation position of the wiper control device 1 is arranged so that the set detection surface 3 is within a wiping operation range of one wiper 5b and outside the wiping operation range of the other wiper 5a.

A vehicle control computer or wiper motor 1100 is connected to the wiper control device of the present invention and can be selected as appropriate according to the preferred embodiment of the present invention. When the vehicle control computer is connected, the wiper motor is controlled through the vehicle control computer. When the wiper motor is connected, the wiper motor is directly controlled.

The raindrop detection part 122 detects raindrops based on the output signal of the light receiving element of the rain sensor. As a method for detecting rain drops, a method for detecting dynamic adhesion of raindrops (JP-A-2001-180447) and a method for evaluating fluctuation of an output signal of a light receiving element (JP-A-2002-277386) disclosed by the inventors may be used. Also, as a method for detecting raindrops, a method for detecting raindrops in comparison with a reference value disclosed in JP-A-61-37560 (so-called threshold value method) and a method for detecting raindrops by an integrated value of the light receiving element output disclosed in JP-A-4-349053 (so-called integration method) may be also used.

The detection part 124 for the amount of water collected by the wiper detects the amount of water carried by the wiper blade and passing through the detection surface (passing water amount) with wiping operation of the wiper. The interface 126 converts a wiper driving signal from the higher layer (third layer) to a signal in the format conforming to the vehicle control computer or the wiper motor, respectively.

The wiping state control part 132 controls wiping state of the wiper based on the output of the raindrop detection part 122. The wiper wiping stage includes, for example, a stop state, an intermittent wiping state, a low-speed continuous wiping state and a high-speed continuous wiping state. The wiper wiping state is defined by the wiping waiting time and wiping speed. The wiping state control part 132 determines these wiping states and outputs a wiper driving signal of a predetermined wiping waiting time and a predetermined wiping speed.

The wiper stop control part 134 controls stop of wiping of the wiper based on the output of the detection part 124 of the water amount collected by the wiper and the output of the raindrop detection part 122. In concrete, it is determined if the passing water amount is not less than a predetermined threshold value or not and if the passing water amount is at the predetermined threshold value or more and raindrops are not detected by the raindrop detection part 122, the wiper driving signal from the wiping state control part 132 is masked. On the other hand, if this condition is not applicable, the wiper driving signal is made to transmit. The wiper driving signal is outputted to the vehicle control computer or wiper motor 1100 through the interface 126.

What is characteristic in this preferred embodiment is that the wiping state control part 132 determines the wiping state independently based on the output of the raindrop detection part 122, while the wiper stop control part 134 executes stop control independently based on the output of the raindrop detection part 122 and the passing water amount.

The wiping state control part 132 changes the wiping state among the stop state, intermittent wiping state, low-speed continuous wiping state and high-speed continuous wiping state according to the rainfall state (if intermittent wiping is divided into plural steps, transition is also made between the steps). When changing between each of these wiping states, it is preferable to provide a predetermined preliminary wiping period or preliminary wiping number of times. That is because raindrop adhesion probability is limited due to the installation position of the detection surface and the small detection surface, and it is necessary to complement this. The wiping state is defined stepwise by the wiping waiting time and wiping speed. The wiping waiting time also includes zero (that is, no waiting time). For example, the longer the wiping waiting time is, the longer the intermittence time, while if the wiping waiting time is zero, it means continuous wiping.

The wiper stop control part 134 masks the wiper driving signal regardless of the wiping state of the wiping state control part 132. Therefore, a temporary stop state can be made separately from the stop state included in the wiping state. In the meantime, even if the wiper driving signal is masked, the wiping state control part 132 is functioning effectively, and if raindrops are detected, the wiping state can be determined according to it and a predetermined wiper driving signal can be outputted.

(Control of Wiping State)

Control of the wiping state will be described in more detail. First, the raindrop detection part 122 uses, as a method for detecting raindrops, a method for detecting dynamic adhesion of raindrops (JP-A-2001-180447) and a method for evaluating fluctuation of an output signal of a light receiving element (JP-A-2002-277386).

The method for detecting dynamic adhesion of raindrops disclosed by the inventors (JP-A-2001-180447) generates a delay signal form a signal from the light receiving elements, acquires a difference between the signal from the light receiving element and the delay signal and determines it as there was a collision of water drops on the detection surface when a difference is generated. Alternatively, a primary delay signal of the signal from the light receiving element is generated, a secondary delay signal is generated from the primary delay signal, a difference between the primary delay signal and the secondary delay signal is acquired and determines it as there was a collision of water drops on the detection surface when a difference is generated. By this method, dynamic adhesion itself of raindrops or the like can be captured.

Therefore, the raindrop detection part 122 detects the phenomenon of a collision of raindrops on the detection surface and outputs it as adhesion of raindrops.

The wiping state control part 132 judges an adhesion cycle of raindrops based on the adhesion of raindrops and determines the wiping state of the wiper based on this. For example, when a long adhesion cycle is detected, a long intermittence time is determined as the wiping state. As the adhesion cycle gets shorter, the intermittence time is made shorter. Alternatively, as mentioned above, when the adhesion cycle is changed, the current intermittence time is maintained for a predetermined preliminary wiping period or till the preliminary wiping number of times is finished, and the intermittence time is changed after that.

In the meantime, consideration by the inventor has confirmed that the diameter of raindrop in the nature is varied and the larger it becomes, the more visibility is likely to be prevented in a short time. Therefore, if the diameter of the raindrop is large, it is preferable to wipe them in a shorter time even if the adhesion cycle is the same. Therefore, the wiping state control part 132 determines the wiping state also by the size of the adhering raindrop in addition to the adhesion cycle. A method for estimating the size of the raindrop is shown hereinafter.

To estimate the size of the raindrop, JP-A-2002-277386 disclosed by the inventors is used. This method can indirectly detect dynamic fluctuation of an adhering object by dynamic fluctuation of a signal of the light receiving element obtained through the adhering object adhering on the detection surface, and moreover, this method can determine what the adhering object is and in what state the adhering object is by detecting the change pattern of fluctuation of the adhering object indirectly determined by physical properties through the change pattern of the fluctuation of the signal.

The change pattern of the fluctuation of the signal used in the above determination can be the change pattern of the time of fluctuation of the above signal, and the length of the fluctuation of the adhering object can be detected indirectly by the length of the fluctuation of the signal. For example, if the adhering object is a raindrop, the larger the raindrop is, the longer the fluctuation lasts as its physical properties, and the size of the raindrop can be estimated by the detected length of the fluctuation.

Also, the change pattern of the fluctuation of the signal used in the above determination can be the change pattern of the size of the fluctuation of the above signal, and the size of the fluctuation of the adhering object can be detected indirectly by the size of the fluctuation of the signal. For example, if the adhering object is a raindrop, the larger the raindrop is, the larger the fluctuation is as its physical properties, and the size of the raindrop can be estimated by the detected size of the fluctuation. Parameters representing the size of fluctuation include the number of change times of increase/decrease within the fluctuation, change amount of the increase, direction of increase/decrease of the change, etc.

Therefore, the raindrop detection part 122 detects and outputs the change pattern of the signal fluctuation. In concrete, the length of the signal fluctuation, the number of change times of increase/decrease within the signal fluctuation, the change amount of increase, direction of increase/decrease of the change, etc. are outputted.

Also, correspondence between various characteristics of change of signal fluctuation including the change pattern of the size of signal fluctuation and the change pattern of the length of the signal fluctuation and the size of raindrops is acquired experimentally, and this is stored in the memory as a table. The wiping state control part 132 determines the size of the raindrops from the change pattern of the detected signal fluctuation based on this table.

Moreover, in addition to determination of the size of raindrops, the wiping state control part 132 may determine the wiping state by judging the intensity of raindrops hitting the windshield glass and identifying if the rain situation is heavy or not. The inventors obtained the finding that the momentum after adhesion of raindrops is changed depending on how the raindrops hit the windshield glass. In concrete, the harder the raindrops hit the windshield glass, the larger the momentum of the raindrops becomes after adhesion.

The momentum of raindrops here can be represented by the length and size of the signal fluctuation. The length of fluctuation is the time till the size of the fluctuation is attenuated to a predetermined size after adhesion of the raindrops. In the meantime, the size of fluctuation is represented by parameters such as the number of change times of increase/decrease in the fluctuation, the change amount of increase, direction of increase/decrease, etc.

In concrete, when the raindrops begin to hit harder, the length of fluctuation gets longer and the size of the fluctuation is increased. The increase in size of the fluctuation can be represented by parameters such as increase in the number of change times of increase/decrease and in the change amount of increase and decrease in the increase/decrease direction of the change.

For example, if the size of two raindrops is equal, the change amount in the decrease direction of the signal at adhesion is the same. However, with the raindrops having larger motion energy, the number of change times of increase/decrease after the adhesion and the change amount of increase are increased and the length of the fluctuation gets longer. Based on this finding, the intensity of hitting of raindrops can be associated with the change pattern of signal fluctuation characterized by the length and the size of the signal fluctuation.

Moreover, correspondence between the way of hitting of the raindrops and the change pattern of the signal fluctuation may be acquired in advance, and a table may be compiled based on this correspondence. The wiping state control part 132 determines the intensity of hitting of the raindrops by evaluating the fluctuation of the signal from the raindrop detection part 122 using such a table.

(Another Method for Determining Wiping State)

For example, the rainfall situation can be classified in detail by using the number of adhering raindrops per unit time or continuity of adhesion, the size of adhering raindrop and the way of hitting of the raindrops as parameters.

The wiping state control part 132 determines these parameters including the number of adhering raindrops per unit time or continuity of adhesion, the size of adhering raindrop and the way of hitting of the raindrops from the output of the raindrop detection part 122, distinguishes the current rainfall situation in detail using these parameters and selects the wiping state set for each of the rainfall situation.

Figure 23:
FIG. 23 is a diagram showing an example of a table in which rainfall states and wiping states corresponding to them are set.

An example of a table in which the rainfall states and corresponding wiping states are set is shown in FIG. 23. In FIG. 23, the rainfall states are classified into a plurality of levels, and a wiping state corresponding to each of the levels is set. The wiping state control part 132 determines the level to which the rainfall state is applicable using the above parameters and selects the wiping state of the applicable level. Alternatively, the wiping state is changed stepwise from the current wiping state to the selected wiping state.

For example, the long and large fluctuation generally means that the raindrop is large and it is heavy rain. In that case, such control is executed to reduce the intermittence time or to increase the driving speed of the wiper.

In the meantime, the small and short fluctuation generally means that the raindrop is small and it is drizzling rain. In that case, such control is preferable to extend the intermittence time or to decrease the driving speed of the wiper.

Figure 24:
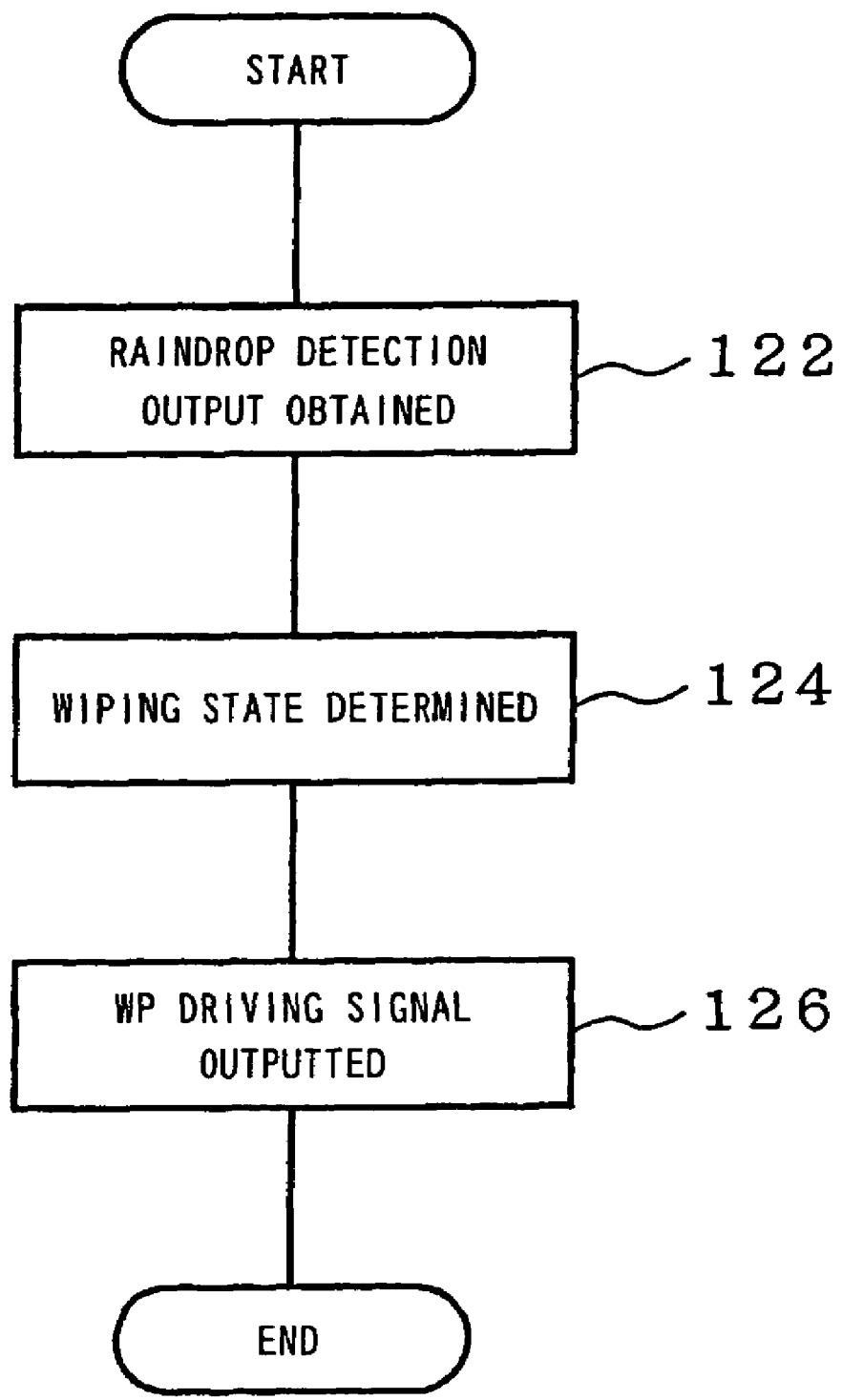
FIG. 24 is a flowchart for explaining operation of a wiper control device according to the fourth preferred embodiment of the present invention.
Figure 25:
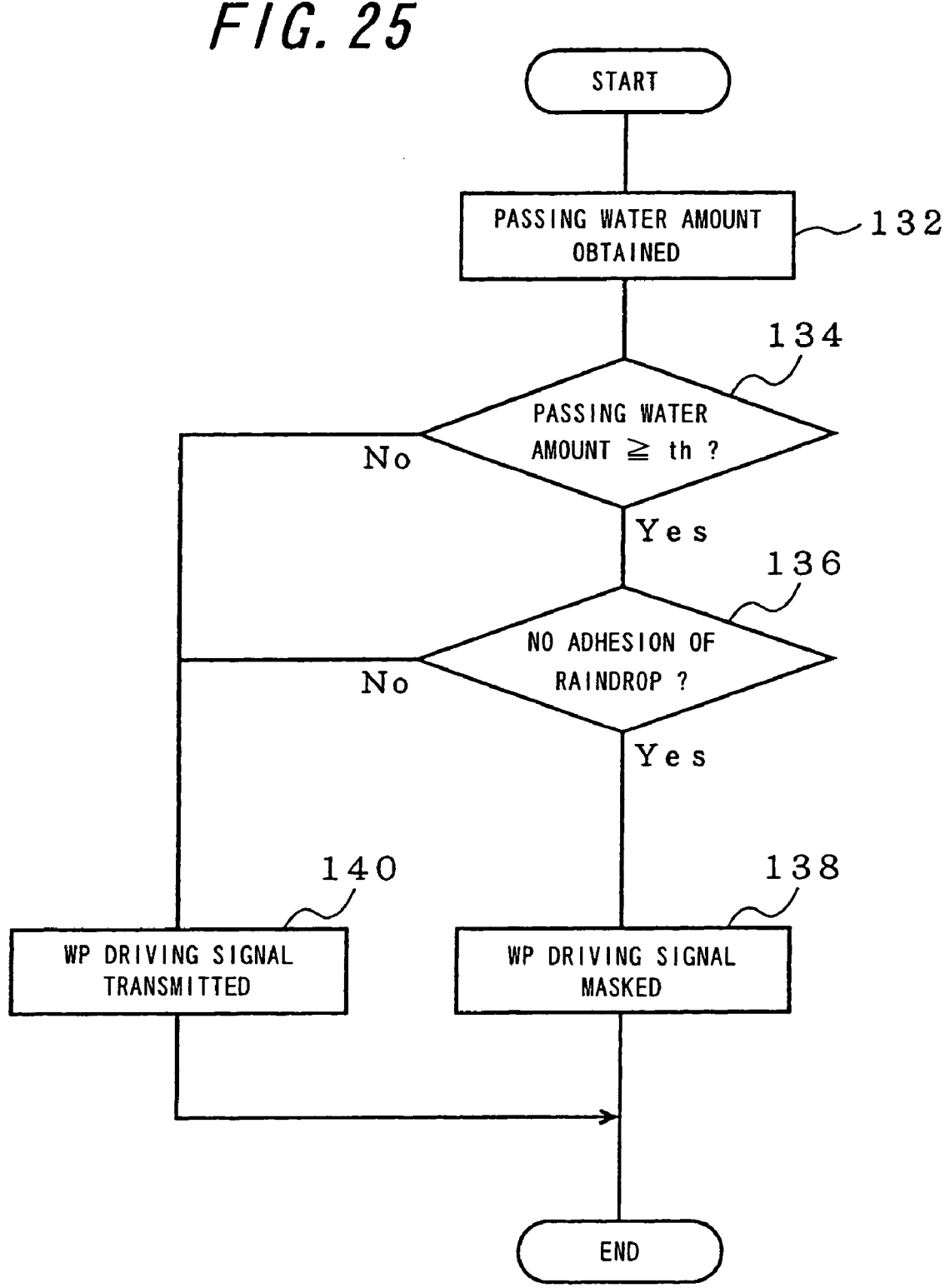
FIG. 25 is a flowchart for explaining operation of a wiper control device according to the fourth preferred embodiment of the present invention.
Figure 26:
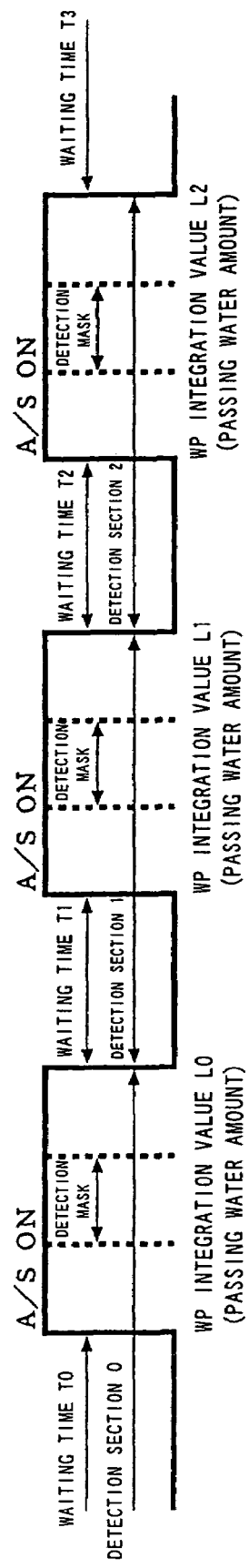
FIG. 26 is a conceptual diagram for explaining a detection section.

Next, operation of the wiper control device according to the fourth preferred embodiment of the present invention will be described referring to FIGS. 24 to 26. FIGS. 24 and 25 are flowcharts for explaining the operation of the wiper control device according to the fourth preferred embodiment of the present invention, and FIG. 26 is a conceptual diagram explaining the detection section.

As shown in FIG. 24, the wiping state control part 132, first at Step 122, obtains an output of the raindrop detection part 122 in a unit detection section. The unit detection section is made of, for example, combination of a waiting time T of the wiper and the subsequent wiper operating time (A/S ON) as shown in FIG. 26. In the wiper operating time, the signal change when the wiper blade passes through the detection surface is extremely large, and the detection signal is masked at passage of the wiper blade.

Next, at Step 124, the wiping state is determined. In concrete, the current wiping state is recognized, and transition is made to a required wiping state based on the output of the raindrop detection part 122. For example, transition is made from the stop state to the intermittent wiping state, or from the low-speed continuous wiping state to the intermittent wiping state.

Next, at step 126, a wiper (WP) driving signal of a predetermined wiping speed is outputted per predetermined wiping waiting time.

In the meantime, as shown in FIG. 25, the wiper stop control part 134, first, at Step 132, obtains the passing water amount in the unit detection section. In FIG. 26, the wiper blade passes through the detection surface in the detection mask section, and the passing water amount is detected in this section. The passing water amount can be a peak value of the signal change in the detection mask section.

Next, at Step 134, it is determined if the detected passing water amount is not smaller than the predetermined threshold value th or not. If the passing water amount is larger than the predetermined threshold value th, it is determined at Step 136 if the raindrops are detected in the unit detection section or not, and if raindrops are not detected, the routine goes to Step 138, where the wiper driving signal is masked. On the other hand, if the detected passing water amount is less than the predetermined threshold value th at Step 134, or if rain-drops are detected in the unit detection section at Step 136, the routine goes to Step 140, where the wiper driving signal is made to transmit.

APPLICATION EXAMPLE

Figure 27:
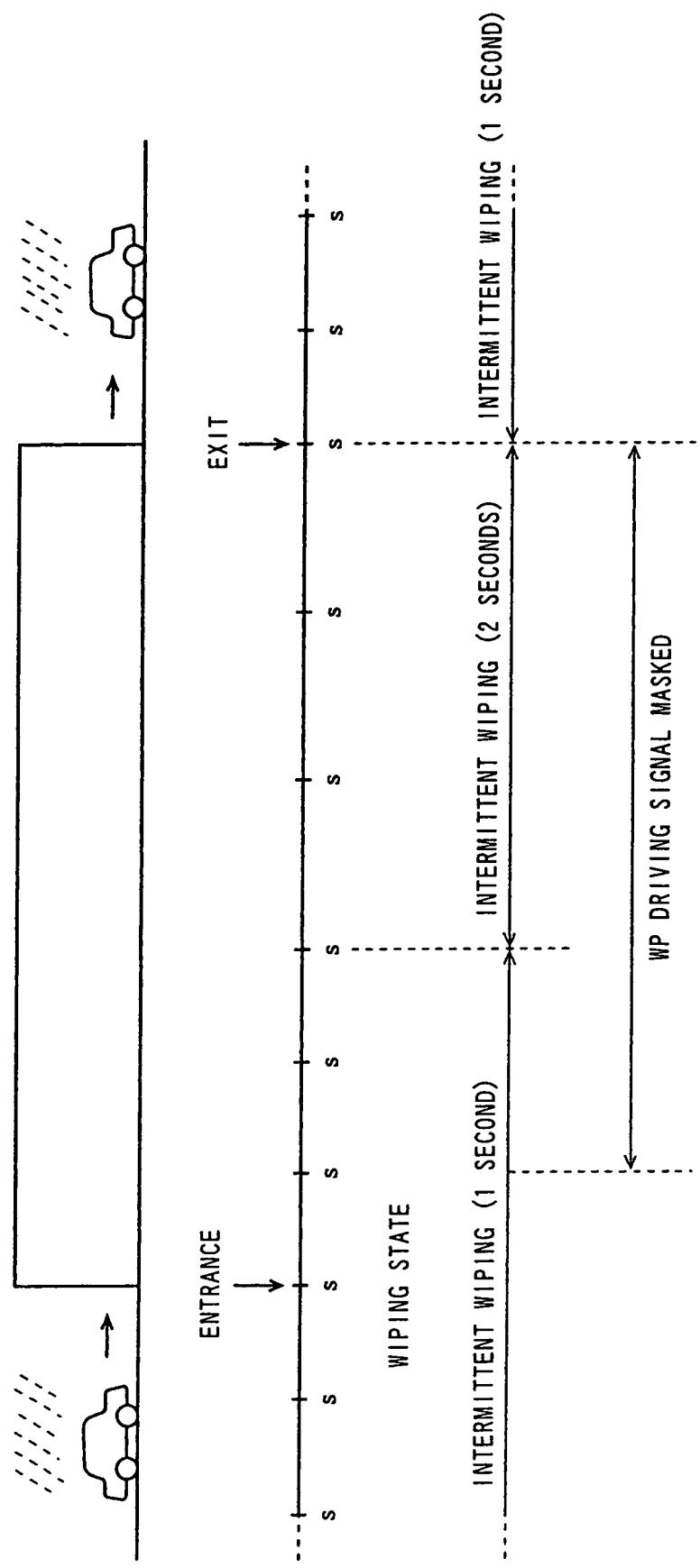
FIG. 27 is a diagram for explaining an application example of the present invention.

Next, as an application example of this preferred embodiments, a case where a vehicle passes through a tunnel in the rainfall state that raindrops with a large diameter to some extent are falling continuously and the wiper is operating continuously will be described using FIG. 27. FIG. 27 is a diagram for explaining the application example of the present invention.

First, before entrance into the tunnel, the raindrop detection part 122 keeps on detecting raindrops, and the wiping state control part 132 determines the wiping state as an intermittent wiping with 1-second waiting time, for example. Based on this intermittent wiping, a wiper driving signal s is outputted in a predetermined cycle. Next, the raindrops are not detected any more after entrance to the tunnel, and the wiping state control part 132 changes the wiping state to the intermittent wiping state with longer waiting time (2 seconds), which makes the output cycle of the wiper driving signal s longer. In this example, the intermittent state is made to transit after predetermined preliminary wiping. After that, if the state where no raindrop is detected continues, the wiping state is made to transit to the stop state. In the meantime, in this example, the vehicle exits from the tunnel at the stage that the wiping state is in the 2-second intermittent wiping state, and raindrops are detected again. The wiping state control part 132 changes the wiping state from the 2-second intermittent wiping to 1-second intermittent wiping.

On the other hand, the wiper stop control part 134 identifies the passing water amount≧threshold value th before entrance to the tunnel, but since raindrops are detected, the wiper driving signal is made to transmit. Next, when detection of raindrops is stopped by entrance to the tunnel and dripping water is supplied to the wiper blade, which establishes determination of passing water amount≧threshold value th, the wiper stop control part 134 masks the wiper driving signal.

When the raindrops are detected again after exit from the tunnel, the wiper stop control part 134 allows the wiper driving signal to transmit.

By this control, based only on the output signal of the light receiving element, rapid change points of the adhesion amount of raindrops on the windshield glass can be identified. Also, since the output of the wiper driving signal can be stopped while maintaining the wiping state in the intermittent wiping state, operation of wiping>stop->wiping can be generated smoothly before and after the passage in case of a tunnel which is not much long.

Fifth Preferred Embodiment

Figure 28:
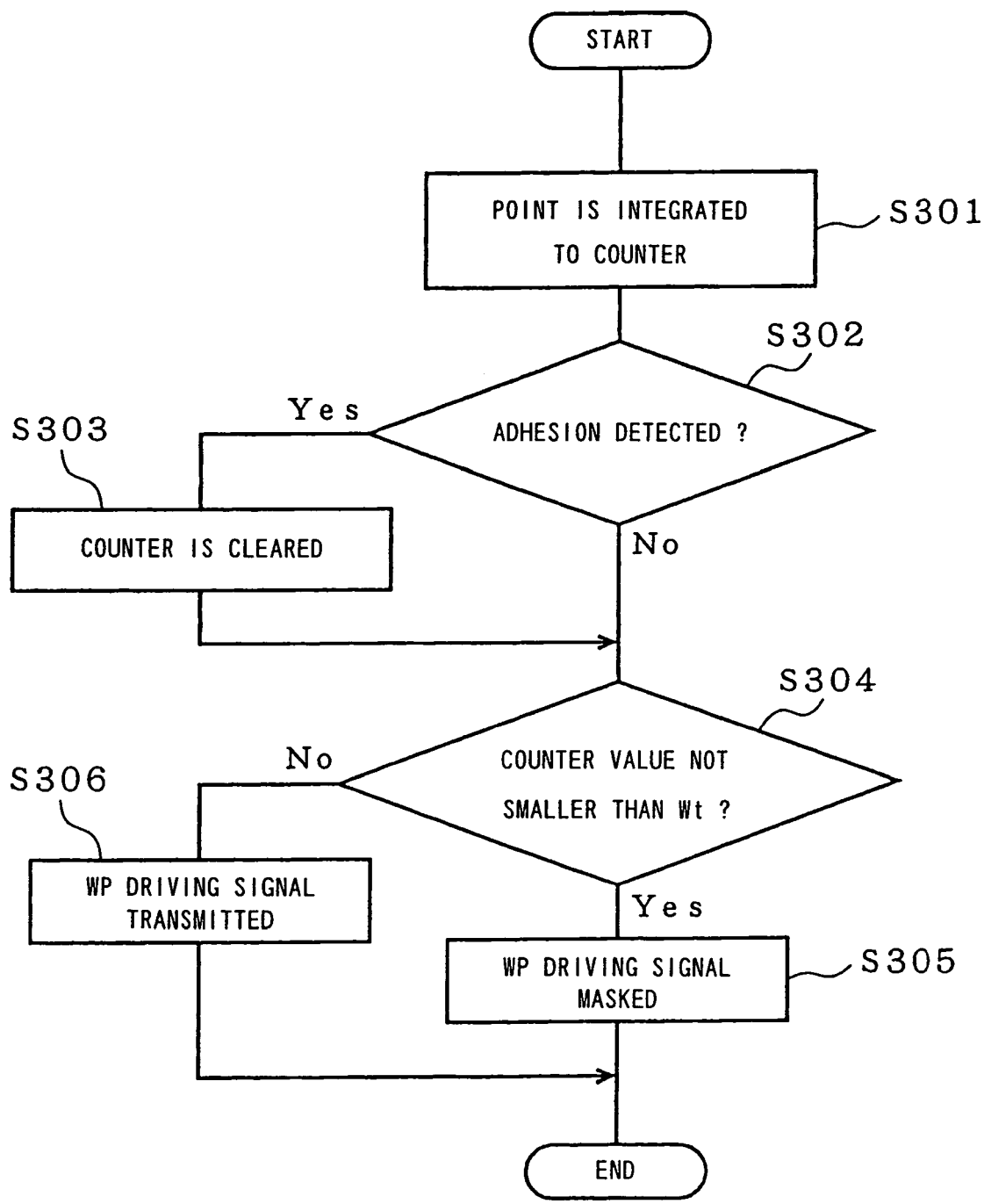
FIG. 28 is a flowchart for explaining a flow of control processing.
Figure 30:
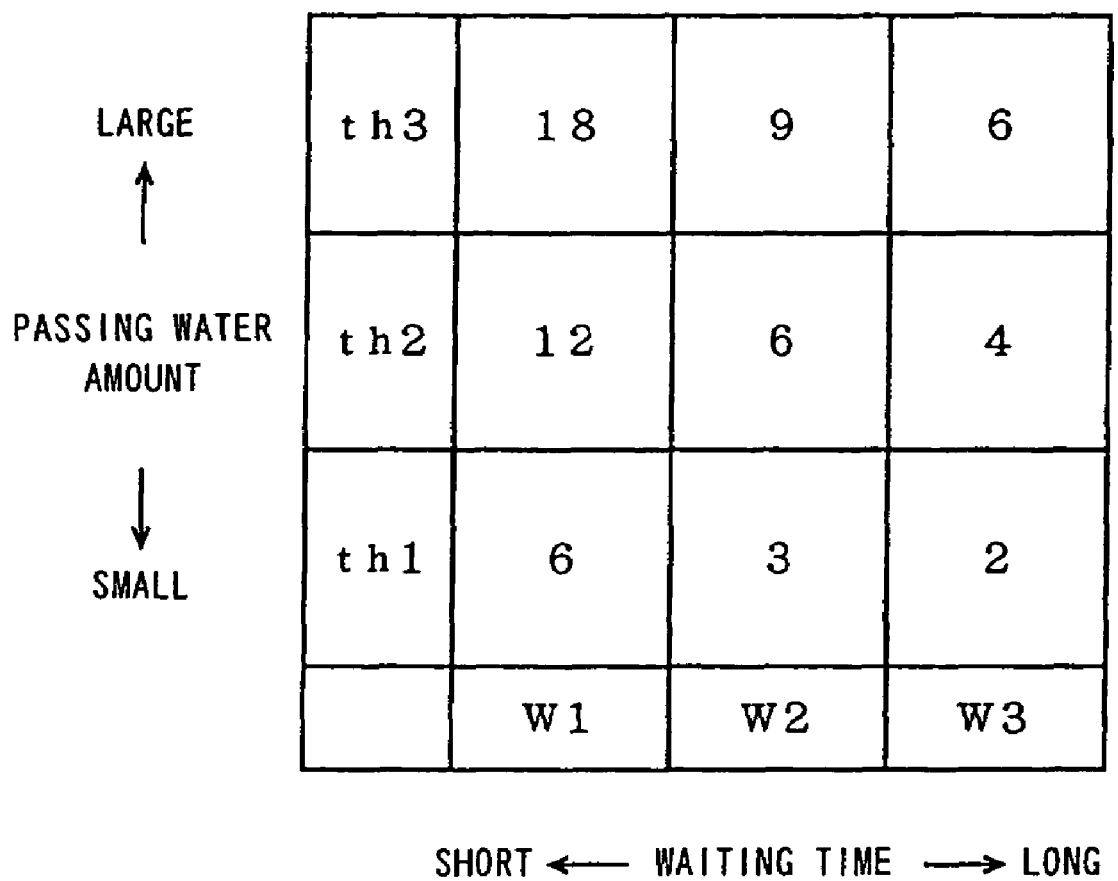
FIG. 30 is a diagram for explaining the relation of passing water amount, waiting time and a point value.

Next, control processing using a point value will be exemplified as the fifth preferred embodiment of the present invention. FIG. 28 is a flowchart for explaining the flow of the control processing, FIG. 29 for explaining the relation between the wiper operation signal and a passing water amount detection timing and FIG. 30 for explaining the relation among the passing water amount, waiting time and the point value.

As shown in FIG. 28, the wiper stop control part 134 is started at the timing when the wiper is retuned to the original position and integrates the passing water amount detected by this wiping in a counter (Step 301). Here, integration of actual passing water amount itself is not adopted. As a value of the passing water amount, a predetermined point value determined by combination of the actual passing water amount and the wiper waiting time is used. This point value will be described below.

As shown in FIG. 29(A), the wiper is operated in a period when the operation signal is ON (operation period) and stands by in a period when the operation signal is OFF (waiting period). In FIG. 29, the operation periods are indicated as OP1, OP2 and OP3, while the waiting periods as W1, W2 and W3. Suppose that W1, W2 and W3 are periods with different length of time (W1<W2<W3). As shown in FIG. 29(B), the passing water amount is detected from the signal in the operation period.

When the passing water amount is detected, the wiper stop control part 134 refers to the waiting period immediately before the operation period in which the passing water amount is detected. Then, the point value is determined from the combination of the value of the passing water amount and the length of the waiting period. In concrete, the matrix in FIG. 30, for example, is used to determine the point value. In the matrix in FIG. 30, the point value is arranged so that it is increased in proportion to the increase of the passing water amount and decreased in reverse proportion to the increase of the waiting period.

As an example, suppose that the water amount of th1 is obtained in the first operation period OP1. The waiting period immediately before OP1 is W1. By applying W1 and th1 in the matrix in FIG. 30, the point value of 6 is obtained. The point value 6 thus obtained is integrated to the counter. For example, if the previous point remains in the counter, the value is integrated to this. By using the point value constituted in this way, an influence by change of the waiting time can be removed from the detected passing water amount.

Next, the wiper stop control part 134 determines if adhesion of raindrops on the detection surface is detected by the raindrop detection part 122 or not (Step 302). Detection of raindrop adhesion is conducted by above mentioned methods and the detection results are stored in a predetermined memory.

When adhesion of raindrops is detected, the counter to which the point value was integrated is cleared to zero (Step 303). Alternatively, the counter is reset to a designated value.

Next, the wiper stop control part 134 determines if the counter value is not smaller than a threshold value Wt (Step 304). Here, the counter value less than the threshold value Wt includes the case where the counter integration value (6 points in the above example) itself is smaller than the threshold value Wt and the case where the counter is cleared at the above step 303.

At Step 304, if the counter value is at the threshold value Wt or more, the wiper driving signal is masked (Step 305), while if the counter value is less than the threshold value Wt, the wiper driving signal is made to transmit (Step 306). The counter value at the threshold value Wt or more at Step 304 means the case where adhesion of raindrops is not detected even though the passing water amount is more than predetermined.

According to this preferred embodiment, the present invention can be brought into practice using small CPU load and a small memory capacity.

Sixth Preferred Embodiment

Next, a sixth preferred embodiment of the present invention will be described. The sixth preferred embodiment of the present invention controls timing of wiping stop. Based on consideration by the inventors, it was found out, in the case where wiping by a wiper is to be stopped based on the premise that adhesion of raindrops is not detected, there is a case where it is preferable to stop after wiping is continued to some extent and a case where wiping is preferably stopped quickly.

For example, at entrance to a tunnel as mentioned above, it is preferable to stop wiping after plural times of wiping. On the other hand, in the case of a small amount of temporary adhesion of micro splashing, it is preferable to stop wiping quickly after one wiping. Moreover, when a predetermined amount of passing water is detected, there can be a situation where it is difficult to determine whether the passing water amount is caused by rainfall or other factors due to limitation of adhesion probability of the detection surface. In such a situation, it is preferable to continue wiping and stop wiping after assuring that the adhesion is not caused by rainfall.

Therefore, in the sixth preferred embodiment of the present invention, timing till wiping is stopped (masked) from detection of the state without adhesion is controlled according to the value of the passing water amount. In concrete, by adjusting the above point value according to the value of passing water amount, the number of wiping times till wiping stop is controlled.

Figure 31:
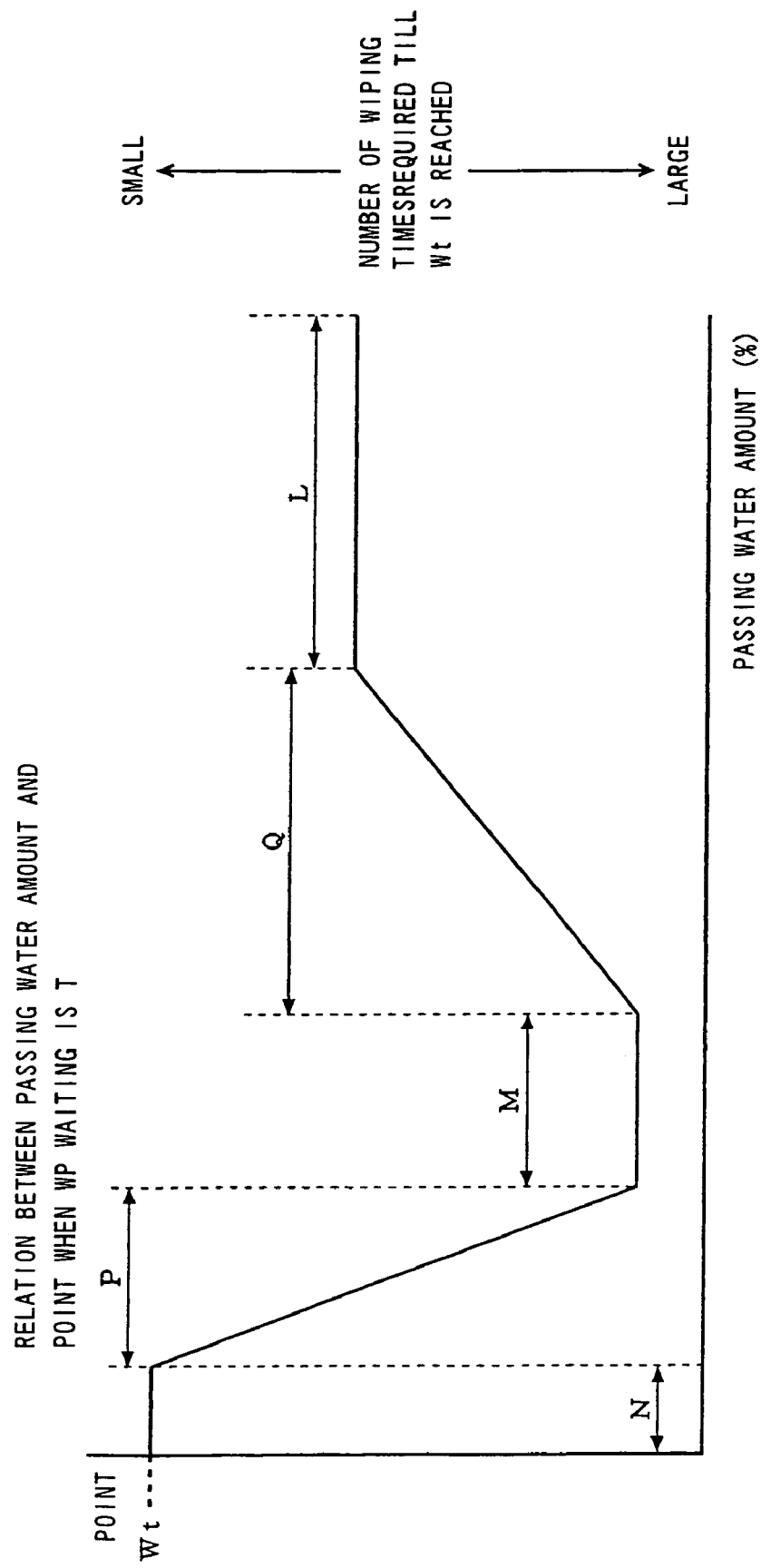
FIG. 31 is a conceptual diagram for explaining the relation between the passing water amount when the wiper waiting time is T and the point.
Figure 32:
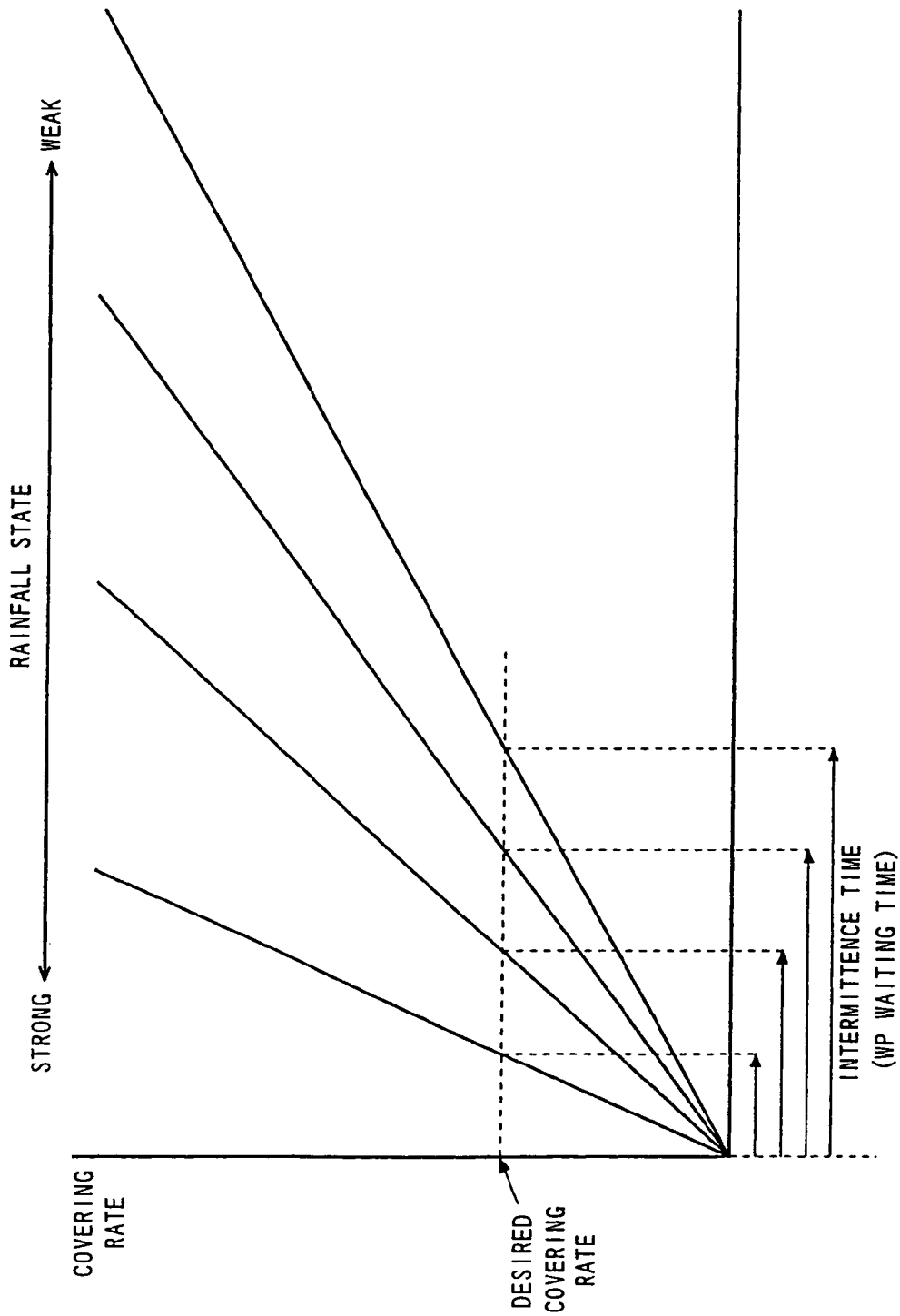
FIG. 32 is a conceptual diagram for explaining a covering rate of the windshield by raindrops.

Concrete explanation will be made using FIGS. 31 and 32. FIG. 31 is a conceptual diagram for explaining the relation between the passing water amount when the wiper waiting time is T and the point. FIG. 32 is a conceptual diagram for explaining the covering rate of the raindrops over the windshield. In FIG. 31, the allocated point values are changed by the value of the passing water amount. In this way, by changing the point value to be allocated to the detected single passing water amount, the number of wiping times (number of detection times) required till the WP driving signal is masked can be controlled.

For example, a maximum point is set in the N band. By setting this maximum point value at the threshold value Wt or more, for example, the wiper can be stopped by a single detection. In the flow in FIG. 28, for example, Wt or more is gained by one determination, and the wiper driving signal is masked immediately. On the other hand, a minimum point is set in the M band. In the case of this minimum point, Wt is reached only after plural times of integration, and plural times of wiping will be continued. If sensitivity adjustment is made by sensitivity volume or the like, the threshold value Wt is preferably changed according to this.

Each of the bands in FIG. 31 will be described. The passing water amount in the N band immediately masks the wiper driving signal as a value which cannot be determined as a passing water amount by adhesion of raindrops or wetting of the wiper blade. That is because even if there is any adhesion of raindrops, it should be determined as extremely small and there is no need for intermittent operation.

Next, in the P band, the detected passing water amount is not likely to generate adhesion of raindrops in the wiper waiting time, and if plural times of wiping are ensured and there is no adhesion of raindrops during the plural times of wiping, it is determined as the rainfall becomes weak or disappears. In the M band, continuity is given importance than stop, and the maximum times of wiping are ensured. In this band, adhesion of the passing water cannot be easily detected even if the rainfall is at a certain level. Then, it is appropriate to determine it as not being caused by rainfall only if the state of no detection of adhesion lasts long.

Next, in the Q band, there is detection of the passing water amount which can expect a good possibility of adhesion of raindrops during the wiper waiting time. Then, if plural times of wiping are ensured and there is no adhesion of raindrops during the plural time, the passing water amount is determined as not being caused by rainfall. Finally, in the L band, the passing water amount to permit adhesion of raindrops during the wiper waiting time, and if plural times of wiping are ensured and there is no adhesion of raindrops during the plural times, the passing water amount is determined as not being caused by rainfall.

In FIG. 31, the relation for the waiting time T was explained. Ideally, the above relation is considered to be fixed in every waiting time. That is because, as shown in the graph in FIG. 32, even if waiting time is changed, the covering rate with which the driver wants to wipe is expected to be constant. Also, if the covering rate is constant, the amount of raindrops on the windshield is constant and the value of the passing water amount collecting this also becomes constant.

However, the larger the rainfall is (waiting time is short), the wider the L band can be. That is because, if the rainfall is large, the covering amount is also large and the probability of the water collected by the wiper to pass over the detection surface becomes high, while if the rainfall is small, the covering amount is also small, and the probability of the water collected by the wiper passes over the detection surface becomes low.

As mentioned above, according to the sixth preferred embodiment of the present invention, the wiper can be stopped at an appropriate timing according to the rainfall situation.

INDUSTRIAL APPLICABILITY

As described above, according to the present invention, change of the rainfall situation can be smoothly responded. Also, a rapid change in the rainfall situation at passage of the rainfall shutoff environment such as in a tunnel can be smoothly responded. Also, as described above, according to the present invention, wiping by a wiper can appropriately follow the change in the rainfall situation. Particularly, the wiping by the wiper can be stopped in a short time when entering a tunnel, while a wiping frequency can be increased to an appropriate level at exit from the tunnel in a short time.

The invention claimed is:

1. A method for controlling operation of a wiper for a windshield glass of a vehicle, comprising the steps of:
   (a) reflecting light emitted from a light emitting element on a detection surface provided at a part of a wiper wiping area of the windshield glass and detecting adhesion of raindrops on the detection surface by receiving the reflected light by a light receiving element,
   (b) determining a rainfall level based on an output signal of said light receiving element;
   (c) determining entrance and exit of said vehicle to and from a rainfall shutoff environment, respectively;
   (d) controlling a wiping state of the wiper in response to the rainfall level determined in step (b) and said determination in step (c), the wiping state being classified and defined as a plurality of stepwise wiping levels according to wiping waiting time and wiping speed and step (d) further including:
   (d1) making setting to lower the wiping level for a low-level rainfall less than a predetermined rainfall level in the rainfall shutoff environment and to raise the wiping level for a high-level rainfall equal to or more than the predetermined rainfall level in preparation for exit of said vehicle from the rainfall shutoff environment; and
   (d2) determining the wiping state of said wiper based on the wiping level set in said Step (d1).

2. A wiper control method according to claim 1, wherein said detecting adhesion of raindrops is based on a momentum of the output signal of said light receiving element included in a section in which said wiper passes the detection surface.

3. A wiper control method according to any one of claims 1 or 2, wherein the step (c) includes,
   determining entrance of said vehicle into the rainfall shutoff environment based on the fact that the rainfall level determined in step (b) is lowered by a predetermined amount from a rainfall level equal to or more than a predetermined threshold value in a predetermined time and said lowered state lasts for a predetermined period of time, and
   determining exit of said vehicle from the rainfall shutoff environment based on the fact that the rainfall level determined in step (b) is returned to the rainfall level equal to or more than the predetermined threshold value.

4. A method for controlling operation of a wiper by reflecting light emitted from a light emitting element on a detection surface provided at a part of a wiper wiping area of a windshield glass of a vehicle and by detecting a state of said detection surface by receiving said reflected light by a light receiving element, comprising the steps of:
   (a) determining entrance of said vehicle to a rainfall shutoff environment;
   (b) determining if the running speed of said vehicle is at a predetermined threshold speed or more in response to the determination in said Step (a); and
   (c) increasing raindrop detection sensitivity if the running speed of said vehicle is at the predetermined threshold speed or more in said Step (b).

5. A wiper control method according to claim 4, wherein the step (a) for determining entrance of said vehicle to the rainfall shutoff environment includes a step of determining entrance of said vehicle into the rainfall shutoff environment based on the detection of a rainfall level state in which the rainfall is lowered by a predetermined amount from a rainfall level at a predetermined threshold value or more in a predetermined time and determination that said lowered rainfall state lasts for a predetermined period of time.

6. A wiper control device for controlling wiping operation of a wiper for a windshield glass of a vehicle, comprising:
- a rain sensor for reflecting light emitted from a light emitting element on a detection surface provided at a part of a wiper wiping area of the windshield glass and detecting adhesion of raindrops on the detection surface by receiving the reflected light by a light receiving element:
- a rainfall level generation part for determining a rainfall level based on an output signal of said light receiving element;
- a control part for determining entrance and exit of said vehicle to and from a rainfall shutoff environment, respectively, and controlling a wiping state of the wiper in response to the determined rainfall level and the determination of the entrance and exit of said vehicle, the wiping state being classified and defined as a plurality of stepwise wiping levels according to wiping waiting time and wiping speed, said control part including:
- a wiping state control part for making setting to lower the wiping level for a low-level rainfall less than a predetermined rainfall level in the rainfall shutoff environment and to raise the wiping level for a high-level rainfall level equal to or more than the predetermined rainfall level in preparation for the exit of said vehicle from the rainfall shutoff environment
- a wiper driving signal generation part for determining the wiping state of said wiper based on the rainfall level determined by said rainfall level generation part and the wiping level set by said wiping state control part.

7. A wiper control device according to claim 6 wherein said detecting adhesion of raindrops is based on a momentum of the output signal of said light receiving element included in a section in which said wiper passes the detection surface.

8. A wiper control device according to any one of claims 6 or 7, wherein said wiping state control part determines entrance and exit of said vehicle to and from the rainfall shutoff environment respectively based on the fact that, on entrance to the rainfall shutoff environment, the rainfall level is lowered by a predetermined amount from a rainfall level equal to or more than a predetermined threshold value and said lowered state lasts for a predetermined time and on exit from the rainfall environment, the rainfall level is returned to the rainfall level equal to or more than the predetermined threshold value.

9. A wiper control device for controlling operation of said wiper by reflecting light emitted from a light emitting element on a detection surface provided at a part of a wiper wiping area of a windshield glass of a vehicle and by detecting a state of said detection surface by receiving said reflected light by a light receiving element, comprising:
- a wiping state control part for determining entrance of said vehicle to a rainfall shutoff environment and in response to said determination, determining if the running speed of said vehicle is at a predetermined threshold speed or more; and
- a sensitivity control part for raising detection sensitivity of raindrops when said wiping state control part determines that the running speed of said vehicle is at the predetermined threshold speed or more.

10. A wiper control device according to claim 9, wherein the said wiping state control part determines entrance of said vehicle to the rainfall shutoff environment based on the detection of a rainfall level state in which the rainfall is lowered by a predetermined amount from a rainfall level at a predetermined threshold value or more in a predetermined time and determination that said lowered rainfall state lasts for a predetermined period of time.

11. A method for controlling operation of a wiper by reflecting light emitted from a light emitting element on a detection surface provided at a part of a wiper wiping area of a windshield glass of a vehicle and by detecting a state of said detection surface by receiving said reflected light by a light receiving element, comprising the steps of:
- (a) detecting adhesion of raindrops on said detection surface;
- (b) determining the wiping state of said wiper defined by wiping waiting time and wiping speed based on said detected adhesion of raindrops;
- (c) detecting an amount of water carried by the blade of said wiper with wiping operation of said wiper and passing through said detection surface; and
- (d) stopping wiping of said wiper when the amount of water passing through said detection surface is at a predetermined threshold value or more and adhesion of raindrops on said detection surface is not detected;
- wherein the operation of said wiper is controlled through a predetermined wiper driving signal, and said step (d) stops wiping of said wiper by masking said predetermined wiper driving signal.

12. A wiper control device for controlling operation of said wiper by reflecting light emitted from a light emitting element on a detection surface provided at a part of a wiper wiping area of a windshield glass of a vehicle and by detecting a state of said detection surface by receiving said reflected light by a light receiving element, comprising:
- a raindrop detection part for detecting adhesion of raindrops on said detection surface;
- a wiping state control part for determining wiping state of said wiper defined by wiping waiting time and wiping speed based on said detected adhesion of raindrops; and
- a wiper stop control part for stopping wiping of said wiper if the amount of water carried by the blade of said wiper with wiping operation of said wiper and passing through said detection surface is not smaller than a predetermined threshold value or more and adhesion of raindrops on said detection surface is not detected;
- wherein said wiper control device controls operation of said wiper through a predetermined wiper driving signal, and said wiper stop control part stops wiping of said wiper by masking said predetermined wiper driving signal.

* * * * *